US011822806B2

(12) United States Patent
Ng et al.

(10) Patent No.: US 11,822,806 B2
(45) Date of Patent: *Nov. 21, 2023

(54) USING A SECONDARY STORAGE SYSTEM TO IMPLEMENT A HIERARCHICAL STORAGE MANAGEMENT PLAN

(71) Applicant: Cohesity, Inc., San Jose, CA (US)

(72) Inventors: Yu-Shen Ng, Mountain View, CA (US); Nagapramod Mandagere, Los Altos, CA (US); Karandeep Singh Chawla, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,069

(22) Filed: Sep. 19, 2022

(65) Prior Publication Data

US 2023/0013391 A1 Jan. 19, 2023

Related U.S. Application Data

(63) Continuation of application No. 16/865,098, filed on May 1, 2020, now Pat. No. 11,494,105.

(51) Int. Cl.
*G06F 3/06* (2006.01)
*G06F 11/14* (2006.01)

(52) U.S. Cl.
CPC ............ *G06F 3/0647* (2013.01); *G06F 3/067* (2013.01); *G06F 3/0619* (2013.01);
(Continued)

(58) Field of Classification Search
CPC .... G06F 3/0647; G06F 3/0619; G06F 3/0653; G06F 3/0659; G06F 3/067;
(Continued)

(56) References Cited

U.S. PATENT DOCUMENTS 5,751,997 A * 5/1998 Kullick ............... G06F 11/1456
709/215
7,257,690 B1 * 8/2007 Baird .................. G06F 11/1471
714/E11.13

(Continued)

FOREIGN PATENT DOCUMENTS

EP 3451173 6/2020
WO 2019045987 3/2019
WO WO-2019045987 A1 * 3/2019 .......... G06F 11/1448

OTHER PUBLICATIONS

Draper et al, "The Architecture of the DIVA Processing-In-Memory Chip", Jun. 22-26, 2002, p. 14 (Year: 2002).

*Primary Examiner* — David Yi
*Assistant Examiner* — Zubair Ahmed
(74) *Attorney, Agent, or Firm* — Van Pelt, Yi & James LLP

(57) ABSTRACT

A copy of files of a primary storage system are stored at a secondary storage system. The metadata associated with the copy of the files of the primary storage system stored at the secondary storage system are analyzed to determine at least a portion of a hierarchical storage tier management plan for the primary storage system including by identifying one or more files to be migrated from a first tier of storage of the primary storage system to a different storage tier. An implementation of at least a portion of the hierarchical storage tier management plan is initiated.

20 Claims, 15 Drawing Sheets

(52) U.S. Cl.
CPC .......... *G06F 3/0653* (2013.01); *G06F 3/0659* (2013.01); *G06F 11/1435* (2013.01); *G06F 11/1461* (2013.01); *G06F 11/1469* (2013.01); *G06F 2201/84* (2013.01)

(58) Field of Classification Search
CPC ............. G06F 11/1435; G06F 11/1461; G06F 11/1469; G06F 2201/84; G06F 3/061; G06F 3/0685
USPC .................................................. 711/162, 161
See application file for complete search history.

(56) References Cited

U.S. PATENT DOCUMENTS

| | | |
|---|---|---|
| 10,255,137 B1 | 4/2019 | Panidis |
| 2007/0299880 A1 | 12/2007 | Kawabe |
| 2013/0110778 A1 | 5/2013 | Taylor |
| 2013/0111171 A1 | 5/2013 | Hirezaki |
| 2014/0244937 A1 | 8/2014 | Bloomstein |
| 2016/0034356 A1 | 2/2016 | Aron |
| 2017/0242871 A1 | 8/2017 | Kilaru |
| 2019/0250998 A1* | 8/2019 | Bedadala ............ G06F 11/1464 |
| 2019/0384678 A1 | 12/2019 | Samprathi |
| 2021/0081285 A1 | 3/2021 | Charfauros |

* cited by examiner

USING A SECONDARY STORAGE SYSTEM TO IMPLEMENT A HIERARCHICAL STORAGE MANAGEMENT PLAN

CROSS REFERENCE TO OTHER APPLICATIONS

This application is a continuation of U.S. patent application Ser. No. 16/865,098 entitled USING A SECONDARY STORAGE SYSTEM TO IMPLEMENT A HIERARCHICAL STORAGE MANAGEMENT PLAN filed May 1, 2020 which is incorporated herein by reference for all purposes.

BACKGROUND OF THE INVENTION

A primary storage system may store a plurality of files (e.g., content files, text files, binary files, etc.). Some of the files may be frequently accessed by one or more users associated with the primary storage system. Some of the files may not be frequently accessed by one or more users associated with the primary storage system. The primary storage system may use an agent to identify the less frequently accessed files. The identified files may be removed from the primary storage system and backed up to a storage system to free up storage space of the primary storage system. However, the agent is using the computing resources of the primary storage system to identify the less frequently accessed files. Such a use of the primary storage system's computing resources may reduce the overall performance of the primary storage system.

BRIEF DESCRIPTION OF THE DRAWINGS

Various embodiments of the invention are disclosed in the following detailed description and the accompanying drawings.

DETAILED DESCRIPTION

Figure 1:
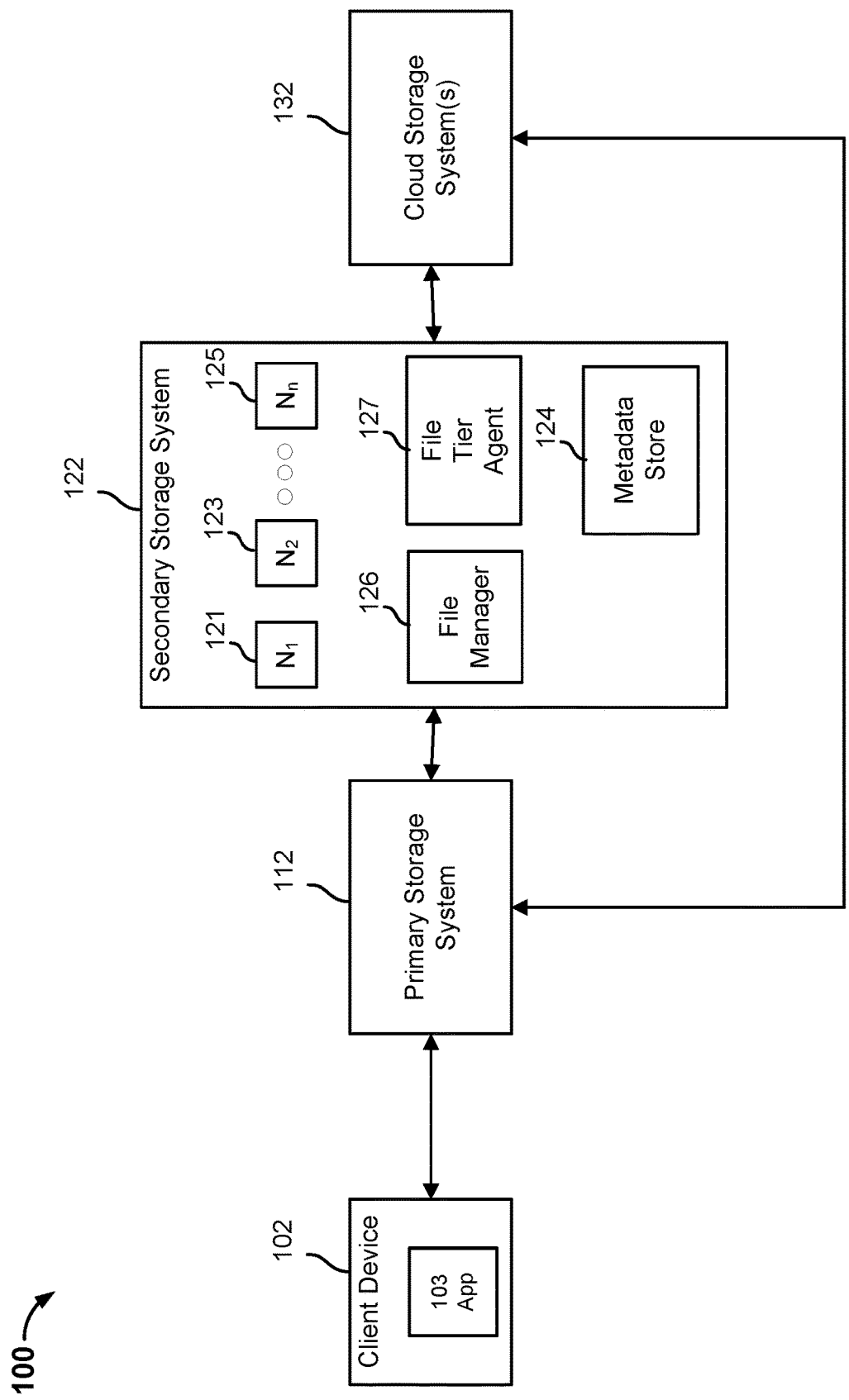
FIG. 1 is a block diagram illustrating an embodiment of a system for hierarchical storage tier management.

A primary storage system stores a plurality of files (e.g., content files, text files, binary files, etc.). The primary storage system is configured to maintain metadata associated with each of the files. For example, the metadata may include access control information and historical information. Access control information may include the owner of the file, the creator of the file, the last modifier of the file, users or groups allowed to read, write, or modify access to the file, and more. Historical information may include a creation time, a last edited time, a last read time, a last access time, etc. The metadata associated with each of the files that is maintained by the primary storage system may be referred to as source metadata. The primary storage system may perform a backup snapshot of its file system data to a secondary storage system. The file system data includes data associated with the plurality of files and the metadata associated with each of the files. The backup snapshot may be a full backup snapshot that includes all of the file system data associated with the primary storage system or an incremental backup snapshot that includes all of the file system data associated with the primary storage system that was not included in a previous backup snapshot.

A secondary storage system is comprised of a plurality of storage nodes. The secondary storage system may ingest and store the file system data across the plurality of storage nodes. The secondary storage system may organize a view of the file system data using a tree data structure. A view of the file system data may be comprised of a file system metadata snapshot tree, which may be based on a B+ tree structure (or other type of tree structure in other embodiments) and one or more file metadata structures. A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file metadata, file system metadata, data associated with a file that is less than or equal to a limit size (e.g., 256 kB), an identifier of a data brick, one or more pointers to one or more file metadata structures (e.g., binary large object structure), a pointer to a data chunk stored on the storage system, a pointer to another leaf node, etc. The file metadata stored by the file system metadata snapshot tree includes the file metadata that was included in a backup snapshot, which may include, but is not limited to, access control information (such as the owner of the file, the creator of the file, the last modifier of the file, users or groups allowed read, write, modify access to the file, and more) and historical information (such as a creation time associated with a file, a last edited time associated with a file, a last read time associated with a file, and/or a last access time associated with a file).

The primary storage system may initially perform a full backup snapshot of its file system data and the secondary storage system is configured to generate a tree data structure that includes an initial file system metadata snapshot tree. The primary storage system may subsequently perform one or more incremental backup snapshots of its file system data and update the tree data structure to include one or more corresponding file system metadata snapshot trees. The tree data structure enables a plurality of backup snapshots to be linked such that each file system metadata snapshot tree provides a complete view of the primary storage system corresponding to a moment in time when the backup snapshot was performed. A file system metadata snapshot tree corresponding to an incremental backup snapshot provides a complete view of the primary storage system at the particular moment in time because the file system metadata snapshot tree includes references to data of the primary storage system that was previously stored. For example, a node associated with a current file system metadata snapshot tree may include one or more references to nodes associated with one or more previous file system metadata snapshot trees that correspond to one or more previous backup snapshots.

After one or more backup snapshots are performed, the secondary storage system may be configured to infer metadata associated with a file. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The source metadata associated with a file included in a plurality of backup snapshots associated with a particular period of time may be analyzed to determine when events occurred on the file. For example, the first time a file is generated on the primary storage system and backed up to the secondary storage system, the file system metadata snapshot tree corresponding to the backup snapshot may store a creation time associated with the file (i.e., a creation time of the file on the primary storage system). The file may be subsequently edited by a user associated with the primary storage system. The data associated with the edited version of the file may be included in a subsequent backup snapshot. The file system metadata snapshot tree corresponding to the subsequent backup snapshot may store a modification time associated with the edited version of the file. The secondary storage system may infer metadata associated with the file based on the source metadata. For example, the secondary storage system may determine an estimated number of times that the file has been accessed within a particular period of time based on the one or more file system metadata snapshot trees that were generated during the particular period of time.

The source metadata associated with the file provides the secondary storage system with point-in-time metadata information. The source metadata associated with the file may have changed a plurality of times in between backup snapshots, but the source metadata associated with the file included in a backup snapshot represents a state of the source metadata associated with the file at the time the backup snapshot is performed. For example, the data associated with a file may have been modified a plurality of times in between backup snapshots. The source metadata associated with the file may include a modification timestamp for the most recent modification and may not include modification timestamps for the modifications that occurred between the previous backup snapshot and the most recent modification. In some embodiments, the estimated number of times that the file has been modified within a particular period of time is the actual number of times that the file has been modified within a particular period of time (e.g., the file has been modified no more than one time in between backup snapshots for any of the backup snapshots within the particular period of time). In some embodiments, the estimated number of times that the file has been modified within a particular period of time is an approximate number of times that the file has been modified within a particular period of time (e.g., the file has been modified more than one time in between backup snapshots for at least one of the backup snapshots within the particular period of time). Other source metadata information associated with a file, such as read times, access times, whether and when access controls were changed, by whom, and who has access, etc., may be included in a backup snapshot, and analysis on the secondary storage system of such metadata may similarly yield additional inferred metadata about the file.

The data associated with the file that is received in one or more backup snapshots may be analyzed over a particular period of time to determine when events occurred on the file. For example, the first time data associated with a file is included in a backup snapshot to the secondary storage system, a corresponding metadata structure is generated for the file. The backup snapshot has an associated timestamp that indicates when the backup snapshot was performed. A primary storage system may perform one or more backup snapshots that includes data associated with the file and the secondary storage system generates a corresponding metadata structure each time a backup snapshot includes data associated with the file. Each of the one or more backup snapshots have associated timestamps that indicate when the one or more backup snapshots were performed.

The secondary storage system may infer metadata associated with the file based on the data associated with the file that is received in one or more backup snapshots source metadata. For example, the secondary storage system may compare metadata structures associated with a file to determine an estimated number of times the file was modified within a particular time period. The data associated with the file may have been modified a plurality of times in between backup snapshots, but the data associated with the file that is included in a backup snapshot is a cumulative data change of the data associated with the file in between backup snapshots. In some embodiments, the estimated number of times that the file was modified within a particular time period is the actual number of times that the file has been accessed within a particular period of time (e.g., the file has been modified no more than one time in between backup snapshots for any of the backup snapshots within the particular period of time). In some embodiments, the estimated number of times that the file was modified within a particular time period is an approximate number of times that the file has been modified within a particular period of time (e.g., the file has been modified more than one time in between backup snapshots for at least one of the backup snapshots within the particular period of time).

The secondary storage system may compare metadata structures associated with a file to determine an estimated amount of data of the file that has changed within a particular time period. Data may have been removed and/or added to a file in between backup snapshots. For example, in between backup snapshots, 1 GB of data may have been removed from a file and 2 GB of data may have been added to the file. A total amount of data of the file that has changed is 3 GB, but a net amount of data of the file that has changed is 1 GB. In some embodiments, the estimated amount of data of the file that has changed within a particular time period is the actual amount of data of the file that has changed within a particular time period (e.g., the file has been modified no more than one time in between backup snapshots within the particular period of time). In some embodiments, the estimated amount of data of the file that has changed within a particular time period is an approximate amount of data of the file that has changed within a particular time period (e.g., the file has been modified more than one time in between backup snapshots for at least one of the backup snapshots within the particular period of time).

Metadata associated with a file may be inferred based on backup snapshot information. For example, the first time data associated with a file is included in a backup snapshot to the secondary storage system, a corresponding metadata structure is generated for the file. The backup snapshot has an associated timestamp that indicates when the backup snapshot was performed. A creation time of the file may be estimated to be the timestamp associated with the backup snapshot. A primary storage system may perform one or more backup snapshots that includes data associated with the file and the secondary storage system generates a corresponding metadata structure each time a backup snapshot includes data associated with the file. Each of the one or more backup snapshots have associated timestamps that indicate when the one or more backup snapshots were performed. The secondary storage system may infer metadata associated with the file based on the backup snapshot information. For example, the secondary storage system may compare timestamps associated with metadata structures associated with a file to determine an estimated number of times the file was modified within a particular time period. In some embodiments, the estimated number of times that the file was modified within a particular time period is the actual number of times that the file has been modified within the particular period of time (e.g., the file has been modified no more than one time in between backup snapshots within the particular period of time). In some embodiments, the estimated number of times that the file was modified within a particular time period is an approximate number of times that the file has been modified within the particular period of time (e.g., the file has been modified more than one time in between backup snapshots for at least one of the backup snapshots within the particular period of time).

The secondary storage system may use source metadata and/or the inferred metadata associated with all of the files backed up from the primary storage system to determine which files should remain on the primary storage system and which files should be migrated from the primary storage system to a different storage tier (e.g., the secondary storage system, cloud storage, etc.). The secondary storage system may tier files stored on the primary storage system using a hierarchical storage tier management plan that is based on one or more tiering policies.

For example, a tiering policy may indicate that files that have not been created, accessed, or modified (e.g., data associated with a file or metadata associated with the file) within a particular time period are to be migrated from the primary storage system to a different storage tier. The tiering policy may be applied to the metadata associated with the file to determine whether to migrate the file from the primary storage system to the different storage tier. A file system metadata snapshot tree is configured to store the metadata associated with a file (source and/or inferred). The secondary storage system may traverse the file system metadata snapshot trees associated with the particular time period to identify the one or more files that have not been created, accessed, or modified within a particular time period. The secondary storage system may initiate an implementation of at least a portion of the hierarchical storage tier management plan by requesting the primary storage system to migrate to the different storage tier the one or more identified files.

In another example, a tiering policy may indicate that files that have not been accessed or modified (e.g., data associated with a file or metadata associated with the file) more than a threshold number of times within a particular time period are to be migrated from the primary storage system to a different storage tier. The tiering policy may be applied to the metadata associated with a file to determine whether to migrate the file from the primary storage system to the different storage tier. The secondary storage system may traverse the file system metadata snapshot trees associated with the particular time period to determine an estimated number of times a file has been accessed or modified within the particular time period. For each file, the secondary storage system may compare the estimated number of times the file has been accessed or modified within the particular time period to the threshold number to identify one of more files that were accessed, modified or edited more than the threshold number of times within the particular time period.

After the one or more files are identified, the secondary storage system may compare the one or more identified files with a tiering policy associated with the primary storage system. A tiering policy associated with the primary storage system may indicate that a file associated with a particular department or a particular type of file is to remain stored on the primary storage system, regardless of when the file was created, last accessed, or modified. In the event a tiering policy associated with the primary storage system does not prevent a file from being migrated from the primary storage system, the file may be migrated to a different storage tier.

The secondary storage system may verify that the data or metadata associated with one or more identified files has not been modified since a last backup snapshot by sending to the primary storage system a request to verify that the data or metadata associated with an identified file has not changed since the last backup snapshot. In response to receiving the request, the primary storage system may use a change block tracker or equivalent to determine whether the data or metadata associated with an identified file has changed since the last backup snapshot. The primary storage system may send to the secondary storage system a result of the verification. In the event the data or metadata associated with the file has changed since the last backup snapshot, the secondary storage system may re-evaluate its decision to tier the file to a different storage tier. In the event the data or metadata associated with the file has not changed since the last backup snapshot, the secondary storage system may maintain its decision to migrate the file to a different storage tier.

In some embodiments, the different storage tier already stores a latest version of the file. In the event the different storage tier already stores the latest version of the file, the secondary storage system may send file relocation metadata corresponding to the file to the primary storage system. The file relocation metadata corresponding to the file may include an absolute path name for the file and a location of the file on the different storage tier. In some embodiments, the different storage tier does not store a latest version of the file. In the event the different storage tier does not store the latest version of the file, the secondary storage system may send to the primary storage system instructions to copy the file (i.e., the latest version of the file) to the different storage tier. After the latest version of the file is copied to the different storage tier, the secondary storage system may send file relocation metadata corresponding to the file to the primary storage system.

In some embodiments, in response to receiving the file relocation metadata, the primary storage system generates a file relocation object (e.g., symbolic link, stub file, etc.)

corresponding to the file, stores the file relocation object corresponding to the file, and deletes the file. The file relocation object may include the file relocation metadata. In some embodiments, the primary storage system includes a filter driver and in response to receiving the file relocation metadata, the filter driver of the primary storage system maintains the file relocation metadata corresponding to the file and the primary storage system deletes the file.

Using the secondary storage system to make tiering decisions for a primary storage system enables the primary storage system to use computing resources that would have been allocated for tiering decisions, for other purposes. Such an allocation of computing resources may improve an overall performance of the primary storage system.

FIG. 1 is a block diagram illustrating an embodiment of a system for hierarchical storage tier management. In the example shown, system 100 includes a client device 102, a primary storage system 112, a secondary storage system 122, and one or more cloud storage systems 132. In some embodiments, a file may be stored in one of the primary storage system 112, secondary storage system 122, and/or the one or more cloud storage systems 132. Primary storage system 112 may correspond to a first tier of storage, secondary storage system 122 may correspond to a second tier of storage, and the one or more cloud storage systems 132 may correspond to a third tier of storage.

Client device 102 may be a mobile phone, a smart phone, a tablet, a laptop computer, a desktop computer, a server, a smart watch, etc. Client device 102 includes an application 103. Application 103 may send a request for a file to primary storage system 112. The request may be sent via a network connection. The network connection may be wired or wireless. The network may be the Internet, an intranet, a local area network, a home area network, a wide area network, a cellular network, a virtual private network, etc.

In some embodiments, primary storage system 112 includes an application or process (not shown). The application or process may receive from a user associated with primary storage system 112 a request for a file; in another example, the application or process may programmatically request a file from primary storage system 112. In some embodiments, the request for a file is sent via an interprocess API call. In some embodiments, the request for a file is received from a user space process to a kernel space OS process.

In response to receiving a request for a file, primary storage system 112 may provide the data associated with the requested file if the requested file is stored on primary storage system 112 or enable retrieval of data associated with the requested file. Primary storage system 112 may store a file relocation object (e.g., symbolic link, stub file, etc.) for the requested file. The file relocation object may enable retrieval of the requested file at a storage system storing the data associated with the requested file. In some embodiments, primary storage system 112 uses an agent (not shown) to enable retrieval of the requested file. In some embodiments, primary storage system 112 enables retrieval of the requested file without using an agent. In some embodiments, primary storage system 112 uses a filter driver (not shown) to enable retrieval of the requested file. In some embodiments, the data associated with the requested file is stored on secondary storage system 122 or one of the one or more cloud storage systems 132.

In some embodiments, primary storage system 112 stores a file relocation object for the file and in response to a request for the file from a requesting entity (e.g., client device 102, application 103, an application, process, or service running on primary storage system 112), the primary storage system 112 reads the file relocation object for the file to identify a storage system storing the data associated with the requested file and provides to the requesting entity a link to the storage system storing the data associated with the requested file.

In some embodiments, a filter driver of primary storage system 112 maintains file relocation metadata for a file and in response to a request for the file from a requesting entity (e.g., client device 102, application 103, an application, process, or service running on primary storage system 112), the filter driver intercepts the request, reads the file relocation metadata, retrieves the data associated with the file from a location included in the file relocation metadata, and provides the data associated with the requested file to the requesting entity.

In some embodiments, primary storage system 112 stores a file relocation object for a file and in response to a request for the file from a requesting entity, primary storage system 112 reads the file relocation object associated with the requested file and redirects the request to a storage system storing the data associated with the requested file. In some embodiments, the storage system storing the data associated with the requested file is secondary storage system 122 and the redirect causes secondary storage system 122 to use a tree data structure (e.g., a file system metadata snapshot tree and a file metadata structure corresponding to the file) to locate the data associated with the migrated file. This enables secondary storage system 122 to efficiently locate and provide the data associated with the file.

Primary storage system 112 is a computing system that stores file system data. The file system data includes data associated with a plurality of files and the metadata associated with each of the files. For example, the metadata associated with each of the files may include access control information and historical information. Access control information may include the owner of the file, the creator of the file, the last modifier of the file, users or groups allowed read, write, or modify access to the file, and more. Historical information may include a creation time, a last edited time, a last read time, a last access time, etc. Primary storage system 112 may be comprised of one or more servers, one or more computing devices, one or more storage devices, and/or combinations thereof.

Primary storage system 112 may perform a backup snapshot of its file system data and send the file system data to secondary storage system 122. The backup snapshot may be a full backup snapshot or an incremental backup snapshot. A full backup snapshot includes all of the file system data associated with primary storage system 112. The file system data included in the full backup snapshot includes metadata associated with the plurality of files that are stored on primary storage system 112. An incremental backup snapshot includes all of the file system data associated with the primary storage system that was not included in a previous backup snapshot. The file system data included in the incremental backup snapshot includes metadata associated with the one or more files that were modified and/or added since a previous backup snapshot. Primary storage system 112 may include a backup agent (not shown) that is configured to cause primary storage system 112 to perform a backup snapshot (e.g., a full backup snapshot or incremental backup snapshot). In some embodiments, primary storage system 112 includes a backup function and is configured to perform a backup snapshot on its own without a backup agent. In some embodiments, secondary storage system 122 may provide instructions to primary storage system 112, causing primary storage system 112 to execute backup functions without a backup agent.

Secondary storage system 122 is comprised of a plurality of storage nodes 121, 123, 125. Although three storage nodes are shown, secondary storage system 122 may be comprised of n storage nodes. The plurality of storage nodes may be comprised of one or more solid state drives, one or more hard disk drives, or a combination thereof. Each storage node may have its own corresponding processor. In some embodiments, secondary storage system 122 may be configured to ingest a backup snapshot received from primary storage system 112 and configured to store the data associated with the backup snapshot across the storage nodes 121, 123, 125. In some embodiments, secondary storage system 122 is a cloud instantiation of a storage system. For example, the cloud instantiation of secondary storage system 122 may be comprised of three virtual nodes, each virtual node with a storage capacity of 10 TB. In some embodiments, secondary storage system 122 is configured to ingest and store a backup snapshot received from primary storage system 112 and a cloud instantiation of secondary storage system 122 is a replica of secondary storage system 122 and stores a replica of the data stored by secondary storage system 122.

Secondary storage system 122 may include a file manager 126 that is configured to organize the file system data of the backup snapshot using a tree data structure. An example of the tree data structure is a file system metadata snapshot tree, which may be based on a B+ tree structure (or other type of tree structure in other embodiments). Secondary storage system 122 may store a plurality of tree data structures in metadata store 124. Secondary storage system 122 may generate a file system metadata snapshot tree and one or more file metadata structures for each backup snapshot.

The tree data structure may be used to capture different backup snapshots. The tree data structure allows a chain of file system metadata snapshot trees to be linked together by allowing a node of a later version of a file system metadata snapshot tree to reference a node of a previous version of a file system metadata snapshot tree. The previous version of the file system metadata snapshot tree may correspond to an earlier backup snapshot. For example, a root node or an intermediate node of a file system metadata snapshot tree corresponding to a second backup snapshot may reference an intermediate node or leaf node of a file system metadata snapshot tree corresponding to a first backup snapshot.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata structure, a pointer to a data chunk stored on the storage cluster, data associated with an inode, a pointer to a file stored in a different storage tier, etc.

A file metadata structure may include a root node, one or more levels of one or more intermediate nodes associated with the root node, and one or more leaf nodes associated with an intermediate node of the lowest intermediate level. The tree data structure associated with a file metadata structure allows a chain of file metadata structures corresponding to different versions of a file to be linked together by allowing a node of a later version of a file metadata structure to reference a node of a previous version of a file metadata structure.

A leaf node of a file metadata structure may store a value, such as an identifier of a data brick associated with one or more data chunks. The location of the one or more data chunks associated with a data brick may be identified using one or more data structures (e.g., list, table, etc.) stored in metadata store 124. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Primary storage system 112 may initially perform a full backup snapshot of its file system data and secondary storage system 122 is configured to receive and store the file system data, and generate a tree data structure that includes an initial file system metadata snapshot tree. Primary storage system 112 may subsequently perform one or more incremental backup snapshots of its file system data and in response, secondary storage system 122 updates the tree data structure to include one or more corresponding file system metadata snapshot trees. Primary storage system 112 is configured to perform a backup snapshot based on one or more backup policies. A backup policy may indicate that primary storage system 112 is to perform a backup snapshot (full or incremental) based on a schedule (e.g., every day), when a threshold amount of data has changed, in response to a user command, etc.

After one or more backup snapshots are performed, secondary storage system 122 may be configured to infer metadata associated with a file. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The source metadata associated with a file included in a plurality of backup snapshots associated with a particular period of time to determine when events occurred on the file. For example, the first time a file is generated on primary storage system 112 and backed up to secondary storage system 122, a node of the file system metadata snapshot tree corresponding to the backup snapshot stores a creation time associated with the file. The file stored on the primary storage system may be subsequently edited. The data associated with the edited version of the file and the metadata associated with the edited version of the file may be included in a subsequent backup snapshot. The file system metadata snapshot tree corresponding to the subsequent backup snapshot may include source metadata, such as a modification time associated with the edited version of the file, read times, access times, whether and when access controls were changed, by whom, and who has access, etc., and/or inferred metadata, such as the estimated number of times the file was accessed or modified within a particular period of time. In some embodiments, the inferred metadata is stored in a data structure associated with a backup snapshot. The data structure associated with the backup snapshot may store one or more statistics associated with one or more files associated with a backup snapshot, such as the estimated number of times a file was accessed or modified within a particular period of time, etc.

File tier agent 127 may use the source metadata and/or inferred metadata associated with some or all of the files backed up from primary storage system 112 to secondary storage system 122 to determine which files should remain on primary storage system 112 and which files should be migrated from primary storage system 112 to a different storage tier (e.g., the secondary storage system 122, cloud storage 132, etc.). File tier agent 127 may tier files stored on primary storage system 112 using a hierarchical storage tier management plan that is based on one or more tiering policies. The one or more tiering policies may be applied to the metadata associated with a file to determine whether to migrate the file from primary storage system 112 to a different storage system. In some embodiments, the one or more tiering policies may be applied to the metadata associated with a file to determine whether to migrate the file from primary storage system 112 to a different storage system.

For example, a tiering policy may indicate that files that have not been created, accessed, or modified (e.g., data associated with a file or metadata associated with the file) within a particular time period are to be migrated from primary storage system 112 to secondary storage system 122 or cloud storage system(s) 132. File tier agent 127 may traverse the file system metadata snapshot trees associated with the particular time period to identify the one or more files that have not been accessed or modified within the particular time period. Secondary storage system 122 may initiate an implementation of at least a portion of the hierarchical storage tier management plan by requesting primary storage system 112 to migrate to the different storage tier the one or more identified files.

In another example, a tiering policy may indicate that files that have not been accessed or modified (e.g., data associated with a file or metadata associated with the file) more than a threshold number of times within a particular time period are to be migrated from primary storage system 112 to secondary storage system 122 or cloud storage system(s) 132. File tier agent 127 may traverse the file system metadata snapshot trees associated with the particular time period to determine an estimated number of times a file has been accessed or modified within the particular time period. For each file, the file tier agent 127 may compare the estimated number of times the file has been accessed or modified within the particular time period to the threshold number to identify one of more files that have not been accessed or modified more than the threshold number of times within the particular time period. Secondary storage system 122 may initiate an implementation of at least a portion of the hierarchical storage tier management plan by requesting primary storage system 112 to migrate to the different storage tier the one or more identified files.

A tiering policy may indicate that files that have changed access control information, such as users or groups allowed to read or write to the file, are to be migrated from primary storage system 112 to secondary storage system 122 or cloud storage system(s) 132. For example, the access control parameters associated with an employee file may change after the employee leaves a company. The number of users with access to the employee file may have been reduced after the employee left the company. The write permissions associated with the employee file may have changed. The employee file may have been assigned to a group used to preserve or manage the files of ex-employees. File tier agent 127 may traverse the file system metadata snapshot trees associated with the particular time period to identify the one or more files where access control information has changed within the particular time period. Secondary storage system 122 may initiate an implementation of at least a portion of the hierarchical storage tier management plan by requesting primary storage system 112 to migrate to the different storage tier the one or more identified files.

After the one or more files are identified, file tier agent 127 may compare the one or more identified files with a tiering policy associated with primary storage system 112. A tiering policy associated with primary storage system 112 may indicate that a file associated with a particular department or a particular type of file is to remain stored on primary storage system 112, regardless of when the file was last accessed or modified. A tiering policy associated with primary storage system 112 may indicate that a group of files are to be stored on the same storage tier. For example, a first file may be stored in a directory with one or more other files. File tier agent 127 may determine that the first file is to be migrated from primary storage system 112 to secondary storage system 122. This may cause the first file and the one or more other files to be migrated from primary storage system 112 to a different storage tier.

A tiering policy associated with primary storage system 112 may indicate that a file associated with a particular department or a particular type of file is to remain stored on primary storage system 112, regardless of when the file was created, last accessed, or modified. In the event a tiering policy associated with primary storage system 112 does not prevent a file from being migrated from the primary storage system 112, the file may be migrated to a different storage tier.

The different storage tier to which a file is migrated may depend on a frequency of access. For example, a file may be migrated to a first different storage tier in the event the estimated number of times the file is accessed or modified is less than a first threshold amount and greater than or equal to a second threshold amount where the second threshold amount is less than the first threshold amount. The file may be migrated to a second different storage tier in the event the estimated number of times the file is accessed or modified is less than a first threshold amount and less than a second threshold amount where the second threshold amount is less than the first threshold amount.

Secondary storage system 122 may verify that the data or metadata associated with one or more identified files has not been modified since a last backup snapshot by sending to primary storage system 112 a request to verify that the data or metadata associated with an identified file has not changed since the last backup snapshot. In response to receiving the request, primary storage system 112 may use a change block tracker or equivalent to determine whether the data or metadata associated with an identified file has changed since the last backup snapshot. Primary storage system 112 may send to secondary storage system 122 a result of the verification. In the event the data or metadata associated with the file has changed since the last backup snapshot, secondary storage system 122 may re-evaluate its decision to tier the file to a different storage tier. In the event the data or metadata associated with the file has not changed since the last backup snapshot, secondary storage system 122 may maintain its decision to migrate the file to a different storage tier.

In some embodiments, the different storage tier already stores a latest version of the file. In the event the different storage tier already stores the latest version of the file, secondary storage system 122 may send file relocation metadata corresponding to the file to primary storage system 112. The file relocation metadata corresponding to the file may include an absolute path name for the file and a location of the file on the different storage tier. In some embodiments, the different storage tier does not store a latest version of the file. In the event the different storage tier does not store the latest version of the file, secondary storage system 122 may send to primary storage system 112 instructions to copy the file (i.e., the latest version of the file) to the different storage tier. After the latest version of the file is copied to the different storage tier, secondary storage system 122 may send file relocation metadata corresponding to the file to primary storage system 112.

In some embodiments, in response to receiving the file relocation metadata, primary storage system 112 generates a file relocation object (e.g., symbolic link, stub file, etc.) corresponding to the file, stores the file relocation object corresponding to the file, and deletes the file. In some embodiments, primary storage system 112 includes a filter driver and in response to receiving the file relocation metadata, the filter driver of primary storage system 112 maintains the file relocation metadata corresponding to the file and primary storage system 112 deletes the file.

The data associated with some files may be migrated from cloud storage system 132 to secondary storage system 122 or primary storage system 112, depending upon criteria, such as the frequency of access. A file stored in cloud storage system 132 may be accessed for a threshold number of times within a threshold time period (e.g., two accesses within a one year period). The hierarchical storage management plan may implement two separate access thresholds. For example, in the event a file stored in cloud storage system 132 is accessed more than a first threshold, but less than a second threshold, the data associated with the file may be migrated from cloud storage system 132 to secondary storage system 122. In the event a file stored in cloud storage system 132 is accessed more than a first threshold and more than a second threshold, the data associated with the file may be migrated from cloud storage system 132 to primary storage system 112.

In some embodiments, primary storage system 112 performs a backup snapshot that includes data associated with a plurality of files, but metadata associated with the plurality of files (e.g., access control information and historical information) is not included in the backup snapshot. As discussed above, secondary storage system 122 may infer metadata associated with the plurality of files. Secondary storage system 122 may use the inferred metadata associated with the plurality of files to determine whether a file is to be migrated from primary storage system 112 to a different storage tier.

In some embodiments, primary storage system 112 performs a backup snapshot and secondary storage system 122 ingests and stores the metadata associated with the backup snapshot. Instead of storing the data associated with a file, secondary storage system 122 may determine to back up the data associated with the file to cloud storage system(s) 132. The data associated with the file may be backed up from primary storage system 112 to cloud storage system(s) 132. As discussed above secondary storage system 122 may infer metadata associated with the plurality of files. Secondary storage system 122 may use the source metadata and/or the inferred metadata associated with the plurality of files to determine whether a file is to be migrated from primary storage system 112 to a different storage tier. For example, copies of files that are maintained for legal reasons, large files that are unlikely to be restored (e.g., large media files), tax forms, etc., may be tiered to cloud storage system(s) 132 (either through secondary storage system 122 or directly from primary storage system 112).

Figure 2A:
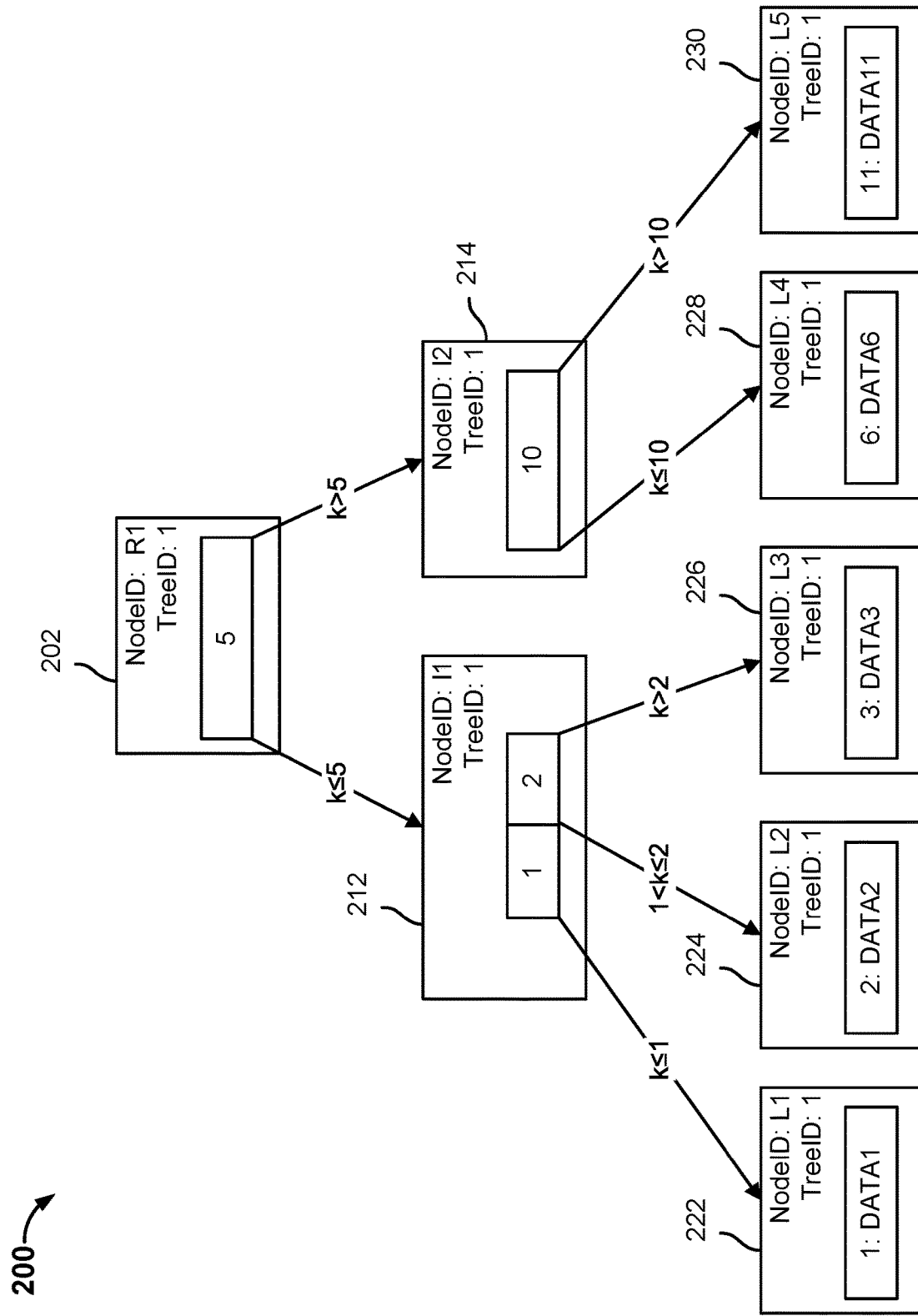
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as secondary storage system 122. A file manager, such as file manager 126, may generate tree data structure 200. Tree data structure 200 may correspond to a full backup snapshot.

Tree data structure 200 is comprised of a file system metadata snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time to. The backup snapshot may be received from a primary storage system, such as primary storage system 112. The file system metadata snapshot tree in conjunction with a plurality of file metadata structures may provide a complete view of the primary storage system associated with the backup snapshot for the particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. Each node of the tree structure includes a view identifier of a view with which the node is associated (e.g., TreeID). The view identifier is associated with a particular moment in time (e.g., when a backup snapshot is performed).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In some embodiments, a leaf node is configured to store the data associated with a file when the size of the file is less than or equal to a limit size (e.g., 256 kB). In some embodiments, a leaf node includes a pointer to a file metadata structure (e.g., blob structure) when the size of data associated with a file is larger than the limit size. In some embodiments, a leaf node corresponds to an inode. In some embodiments, a leaf node stores metadata associated with a file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 214 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store file data when the size of the file is less than or equal to a limit size. In other embodiments, leaf node 222 is a directory inode and is configured to store a pointer to or an identifier of one or more other leaf nodes. In other embodiments, leaf node 222 is a file inode and is configured to store a pointer to or an identifier of a file metadata structure. In some embodiments, leaf node 222 stores metadata associated with a file.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store file data when the size of the file is less than or equal to a limit size. In other embodiments, leaf node 224 is a file inode and is configured to store a pointer to or an identifier of a file metadata structure. In some embodiments, leaf node 224 stores metadata associated with a file.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store file data when the size of the file is less than or equal to a limit size. In other embodiments, leaf node 226 is a directory inode and is configured to store a pointer to or an identifier of one or more other leaf nodes. In other embodiments, leaf node 226 is a file inode and is configured to store a pointer to or an identifier of a file metadata structure. In some embodiments, leaf node 226 stores metadata associated with a file.

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store file data when the size of the file is less than or equal to a limit size. In other embodiments, leaf node 228 is a directory inode and is configured to store a pointer to or an identifier of one or more other leaf nodes. In other embodiments, leaf node 228 is a file inode and is configured to store a pointer to or an identifier of a file metadata structure. In some embodiments, leaf node 228 stores metadata associated with a file.

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store file data when the size of the file is less than or equal to a limit size. In other embodiments, leaf node 230 is a directory inode and is configured to store a pointer to or an identifier of one or more other leaf nodes. In other embodiments, leaf node 230 is a file inode and is configured to store a pointer to or an identifier of a file metadata structure. In some embodiments, leaf node 230 stores metadata associated with a file.

Figure 2B:
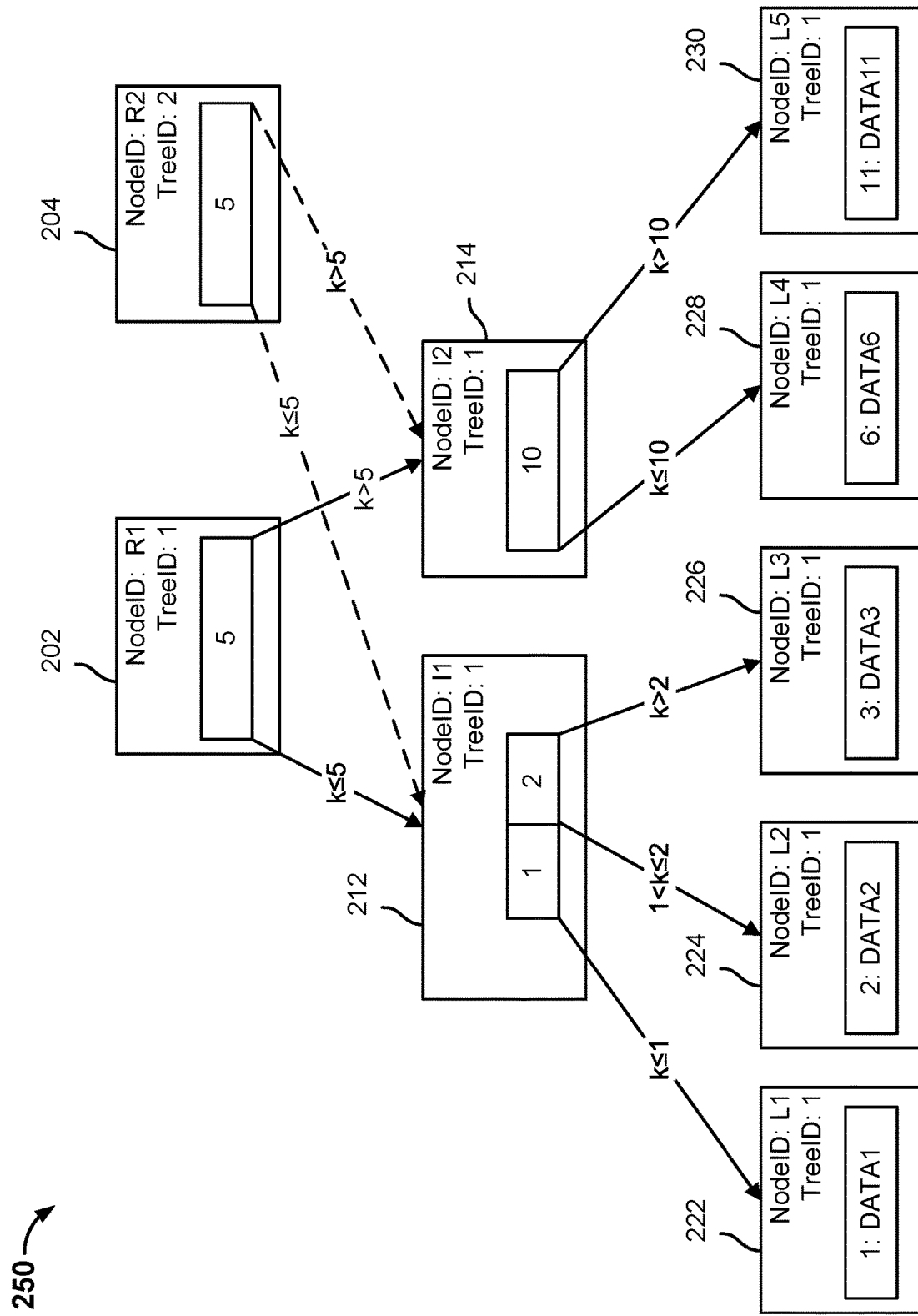
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure (e.g. when a backup snapshot is performed), when data associated with a file system metadata snapshot tree is migrated, when data associated with a file system metadata snapshot tree is restored, when data associated with a file system metadata snapshot tree is replicated, when data associated with a file system metadata snapshot tree is used for test/development purposes, etc. In some embodiments, tree data structure 250 may be created by a storage system, such as secondary storage system 122. The file system data of a primary storage system, such as primary storage system 112, may be backed up to a storage system, such as secondary storage system 122. A subsequent backup snapshot may correspond to an incremental backup snapshot. The tree data structure corresponding to the subsequent backup snapshot is generated in part by cloning a file system metadata snapshot tree associated with a previous backup snapshot.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a file system metadata snapshot tree included in the tree data structure. In some embodiments, the tree data structure allows a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a file system metadata snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
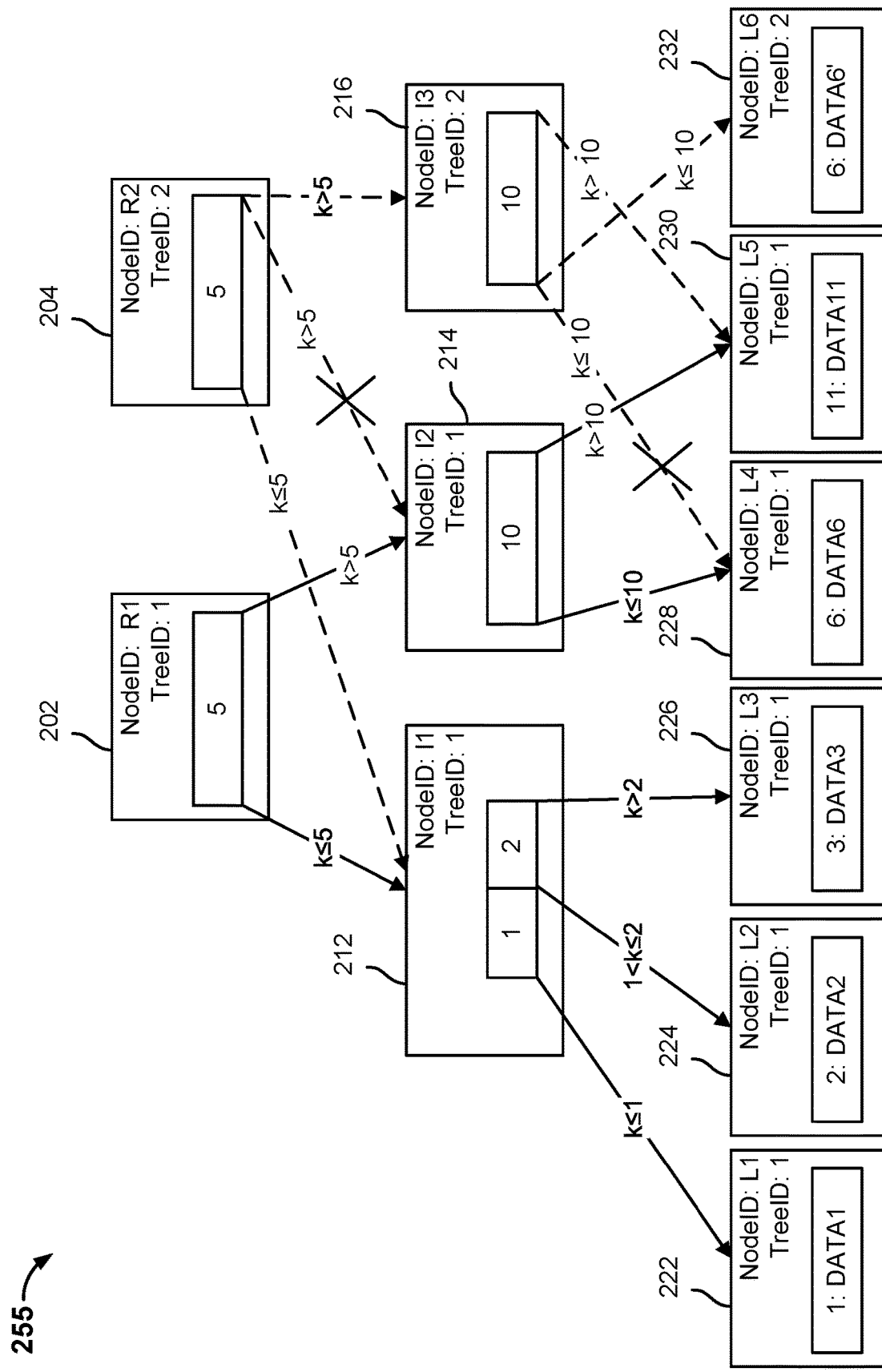
FIG. 2C is a block diagram illustrating an embodiment of modifying a cloned file system metadata snapshot tree.

FIG. 2C is a block diagram illustrating an embodiment of modifying a cloned file system metadata snapshot tree. In the example shown, tree data structure 255 may be modified by a file manager, such as file manager 126. A file system metadata snapshot tree with a root node 204 may be a current view of the file system data, for example, at time $t_1$.

In the example shown, the value "DATA6" has been modified to be "DATA6'." In some embodiments, the value of a key value pair has been modified. In other embodiments, the value of the key value pair is the file data of associated with a file that is smaller than or equal to a limit size. In other embodiments, the value of the key value pair points to a different file metadata structure (e.g., a metadata structure corresponding to a different version of a file). The different file metadata structure may be a modified version of the file metadata structure to which the leaf node previously pointed. In some embodiments, the value of the key value pair no longer points to another node to which the node pointed.

To modify the file system metadata snapshot tree at $t_1$, the file system manager starts at root node 204 because that is the root node associated with the file system metadata snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a file that is smaller than or equal to a limit size.

Figure 2D:
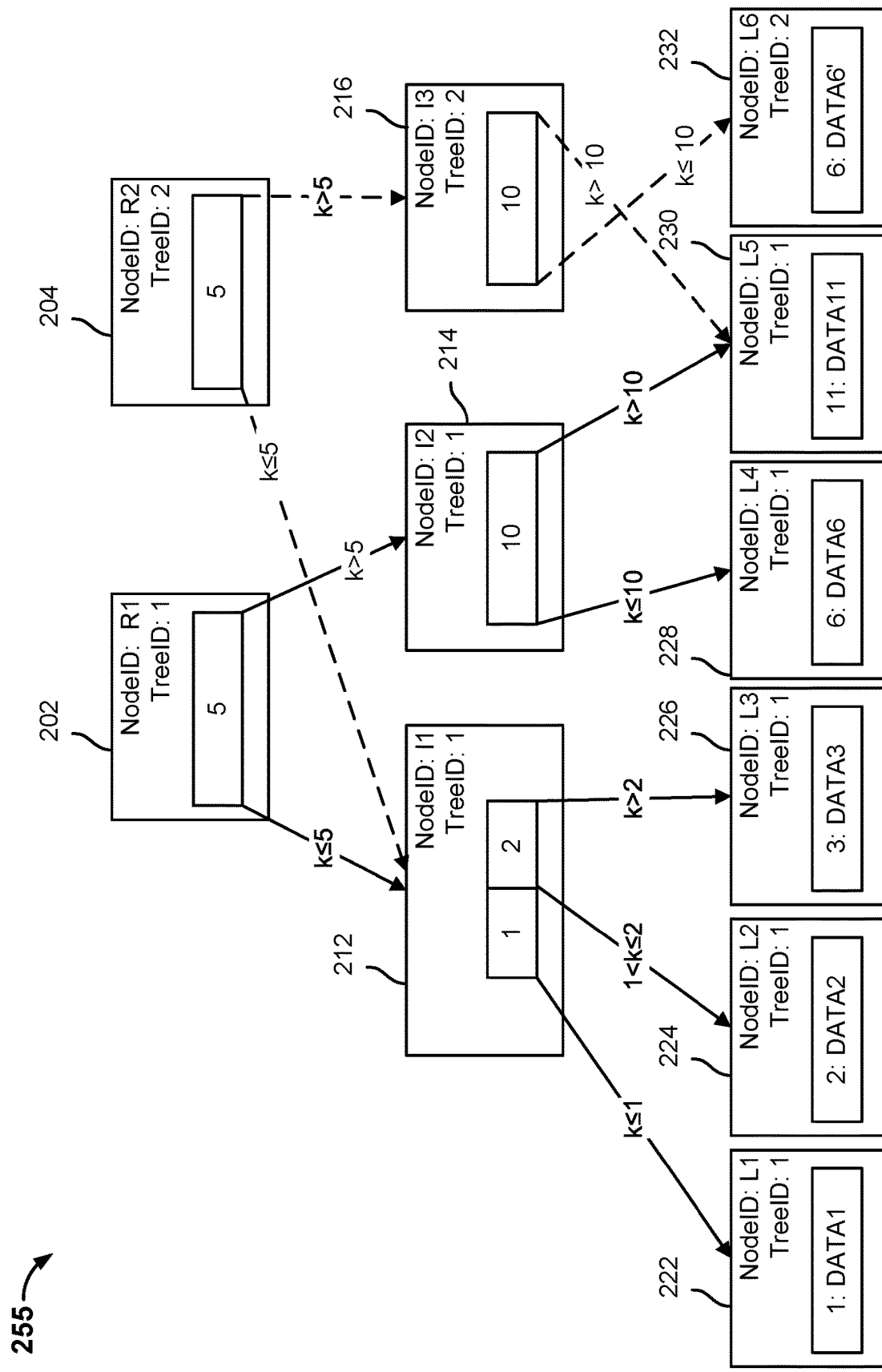
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a file system metadata snapshot tree as described with respect to FIG. 2C.

Figure 3A:
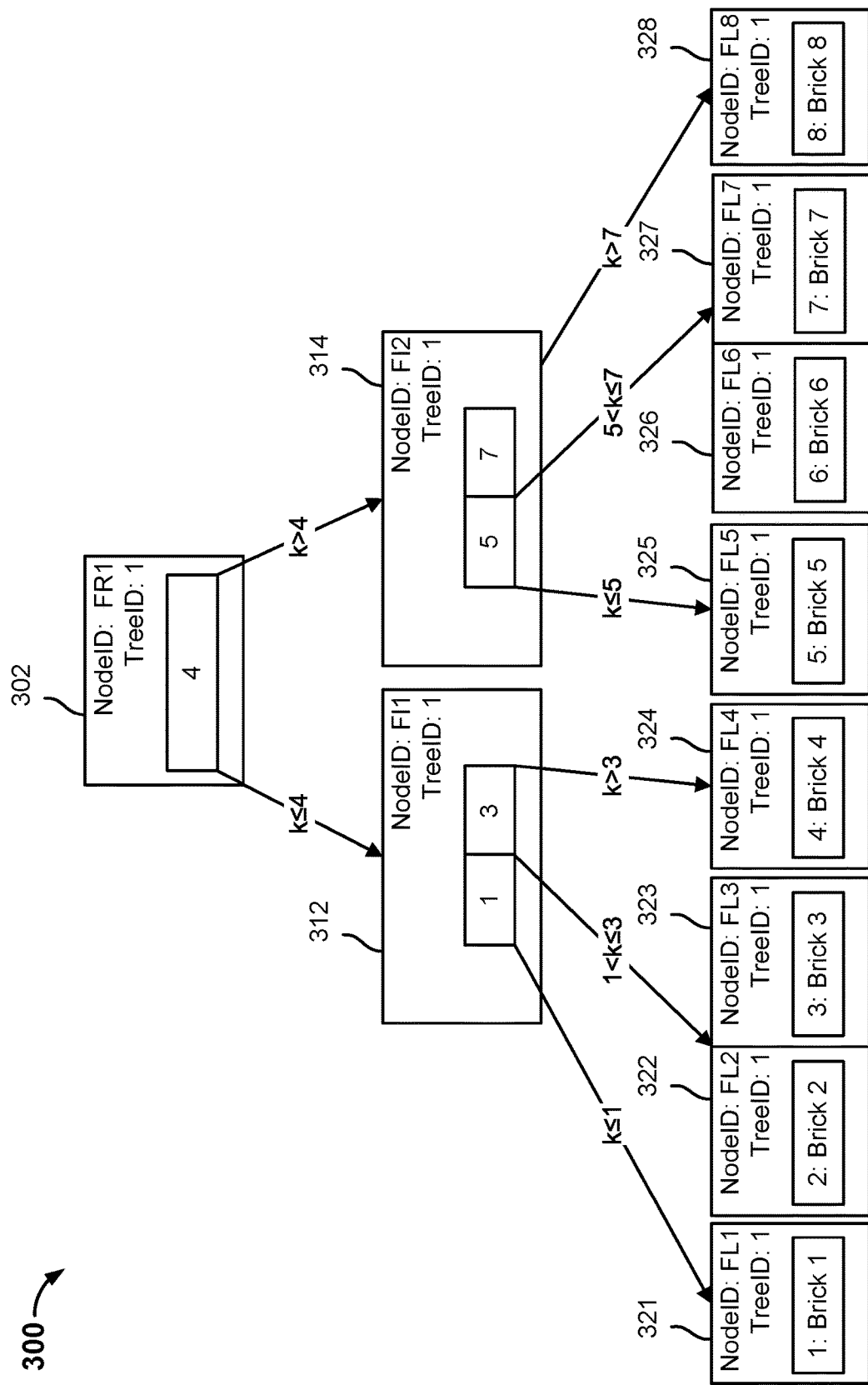
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 122. In the example shown, tree data structure 300 corresponds to a file and stores the file metadata associated with the file. The file metadata associated with a file may be stored by a storage system separate from the contents of the file, that is, the tree data structure storing the file metadata associated with a file is stored separately from the contents of the file. For example, the contents of the file may be stored on a hard disk drive, while tree data structure 300 that holds the file metadata may be stored in storage with faster access times, such as a solid state drive (SSD) of a storage node.

A leaf node of a file system metadata snapshot tree associated with file system data, such as a leaf node of tree data structures 200, 250, 255, may include a pointer to a tree data structure that stores metadata corresponding to a file, such as tree data structure 300.

A tree data structure corresponding to a file at a particular point in time (e.g., a particular version) may be comprised of a root node, one or more levels of one or more intermediate nodes, and one or more leaf nodes. In some embodiments, a tree data structure corresponding to a file is comprised of a root node and one or more leaf nodes without any intermediate nodes. Tree data structure 300 may be a snapshot of a file at a particular point in time t, for example at time to. Tree data structure 300 may correspond to a full backup of a file.

In the example shown, tree data structure 300 includes file root node 302, file intermediate nodes 312, 314, and file leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the file). The view identifier is associated with a particular moment in time (e.g., when a backup snapshot is performed). Root node 302 includes pointers to intermediate nodes 312, 314. Root node 302 includes a NodeID of "FR1" and a TreeID of "1."

In the example shown, intermediate node 312 includes respective pointers to leaf nodes 321, 322, 323, 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a file corresponding to tree data structure 300. Leaf node 328 includes NodeID of "FL8" and a TreeID of "1."

A file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 124, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
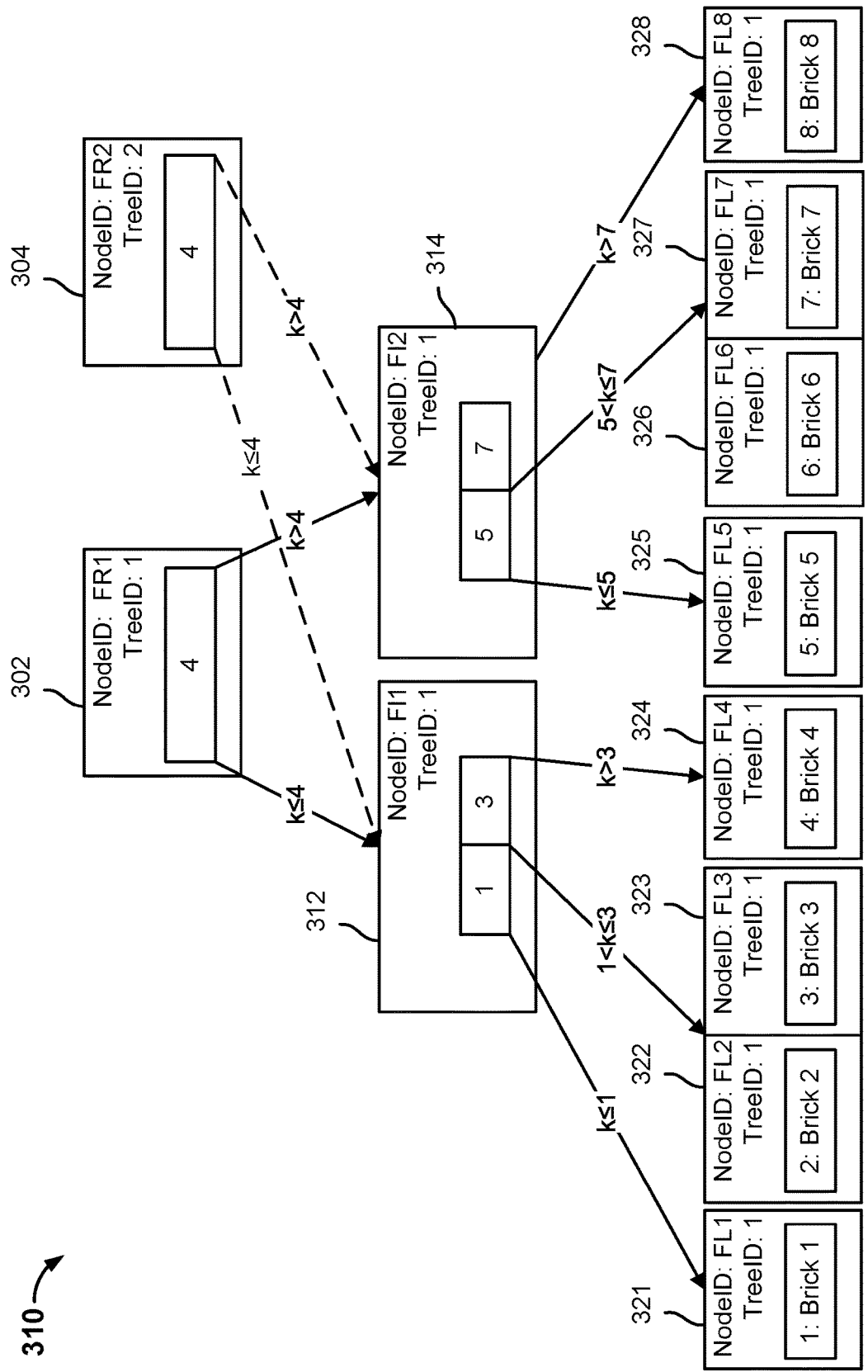
FIG. 3B is a block diagram illustrating an embodiment of a cloned file metadata structure.

FIG. 3B is a block diagram illustrating an embodiment of a cloned file metadata structure. A file metadata structure may be cloned when a subsequent version of a file is stored on a storage system. In some embodiments, tree data structure 310 may be created by a storage system, such as storage system 112. The tree data structure corresponding to a file can be used to capture different versions of a workload, a workload file, or a file at different moments in time. In some embodiments, the tree data structure allows a chain of file metadata structures corresponding to different versions of a file to be linked together by allowing a node of a later version of a file metadata structure to reference a node of a previous version of a file metadata structure. The file metadata structure corresponding to a subsequent version of a file may be generated in part by cloning the file metadata structure corresponding to a previous version of a file.

A root node or an intermediate node of a version of a file metadata structure may reference an intermediate node or a leaf node of a previous version of a file metadata structure. Similar to the file system metadata snapshot tree, the file metadata structure allows different versions of a file to share nodes and allows changes to a file to be tracked. When a backup snapshot is received, a root node of the file metadata structure may be linked to one or more intermediate nodes associated with a previous file metadata structure. This may occur when data associated with a file is included in both versions of the file.

In the example shown, tree data structure 310 includes a first file metadata structure comprising root node 302, intermediate nodes 312, 314, and leaf nodes 321, 322, 323, 324, 325, 326, 327, 328. Tree data structure 310 also includes a second file metadata structure that may be a snapshot of file data at a particular point in time, for example at time $t_1$. The second file metadata structure is comprised of root node 304, intermediate nodes 312, 314, and leaf nodes 321, 322, 323, 324, 325, 326, 327, 328. To create a snapshot of the file data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the file metadata structure at a particular moment in time. The TreeID of a root node indicates a view with which the root node is associated (e.g., file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a file metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a file metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
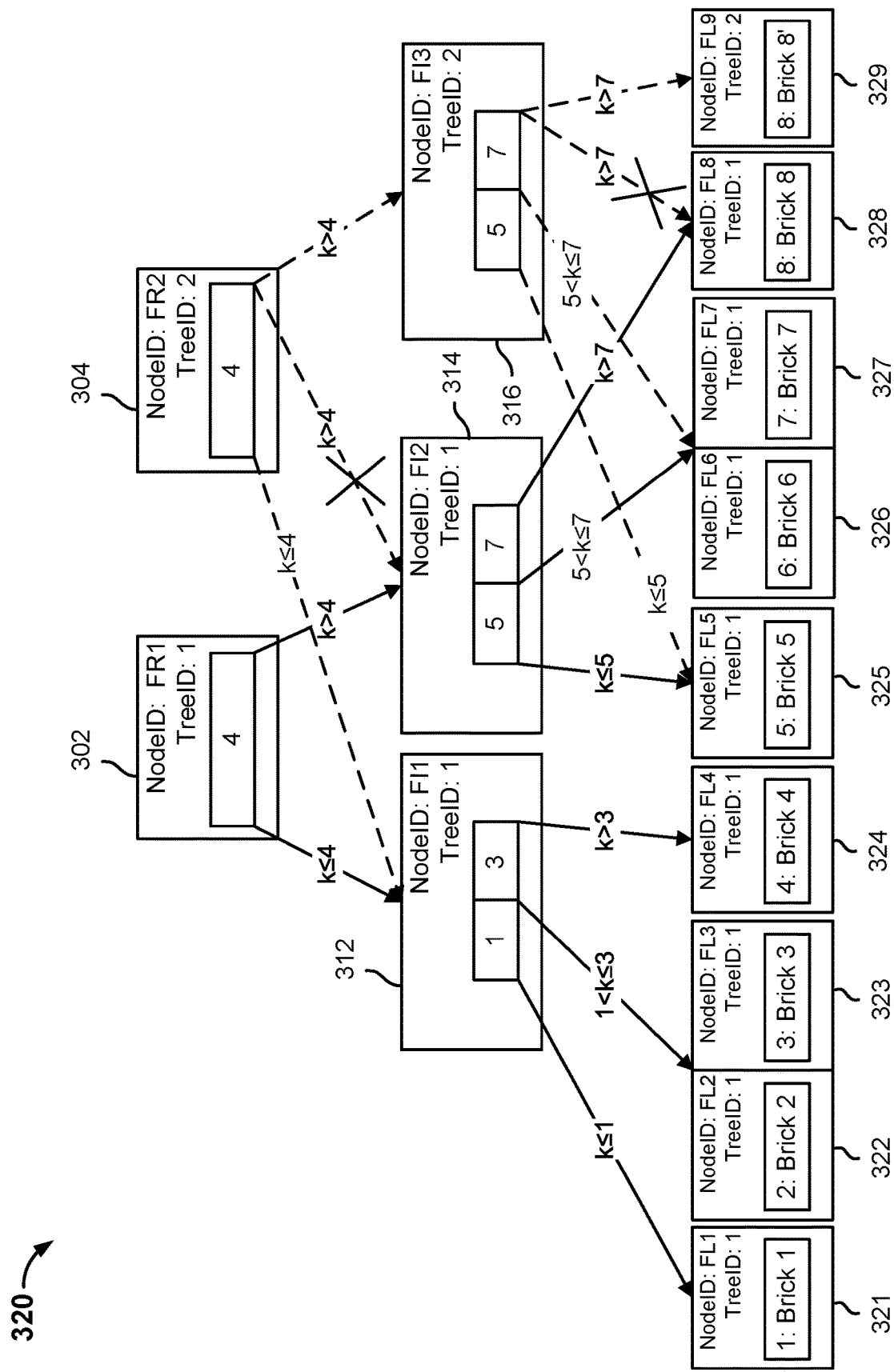
FIG. 3C is a block diagram illustrating an embodiment of modifying a cloned file metadata structure.

FIG. 3C is a block diagram illustrating an embodiment of modifying a cloned file metadata structure. Tree data structure 320 is comprised of a first file metadata structure that includes root node 302 and a second metadata structure that includes root node 304. In the example shown, tree data structure 320 may be modified by a file manager, such as file manager 126.

In some embodiments, the file data associated with a file may be modified such that one of the data chunks is replaced by another data chunk. When a data chunk of file data associated with a previous backup snapshot is replaced with a new data chunk, the data brick associated with the new data chunk may be different. A leaf node of a file metadata structure stores a brick identifier of a data brick that is associated with a data chunk. To represent this modification to the file data, a corresponding modification is made to a current view of a file metadata structure. The current view of the file metadata structure is modified because the previous file metadata structure is a snapshot view and can no longer be modified. The data chunk of the file data that was replaced has a corresponding leaf node in the previous file metadata structure. A new leaf node in the current view of the file metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the file metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
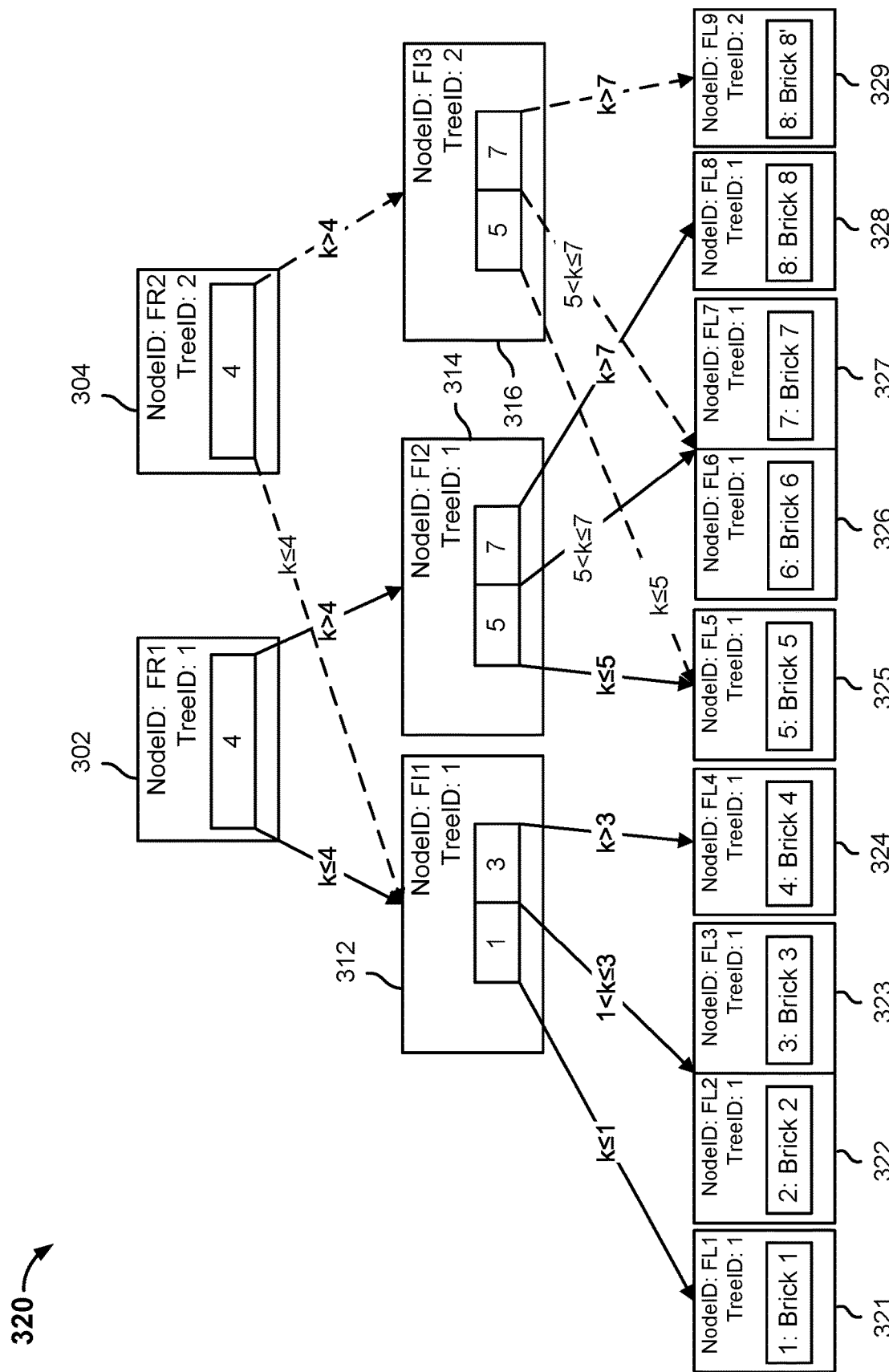
FIG. 3D is a block diagram illustrating an embodiment of a modified file metadata structure.

FIG. 3D is a block diagram illustrating an embodiment of a modified file metadata structure. The tree data structure 320 shown in FIG. 3D illustrates a result of the modifications made to tree data structure 310 as described with respect to FIG. 3C.

Figure 4:
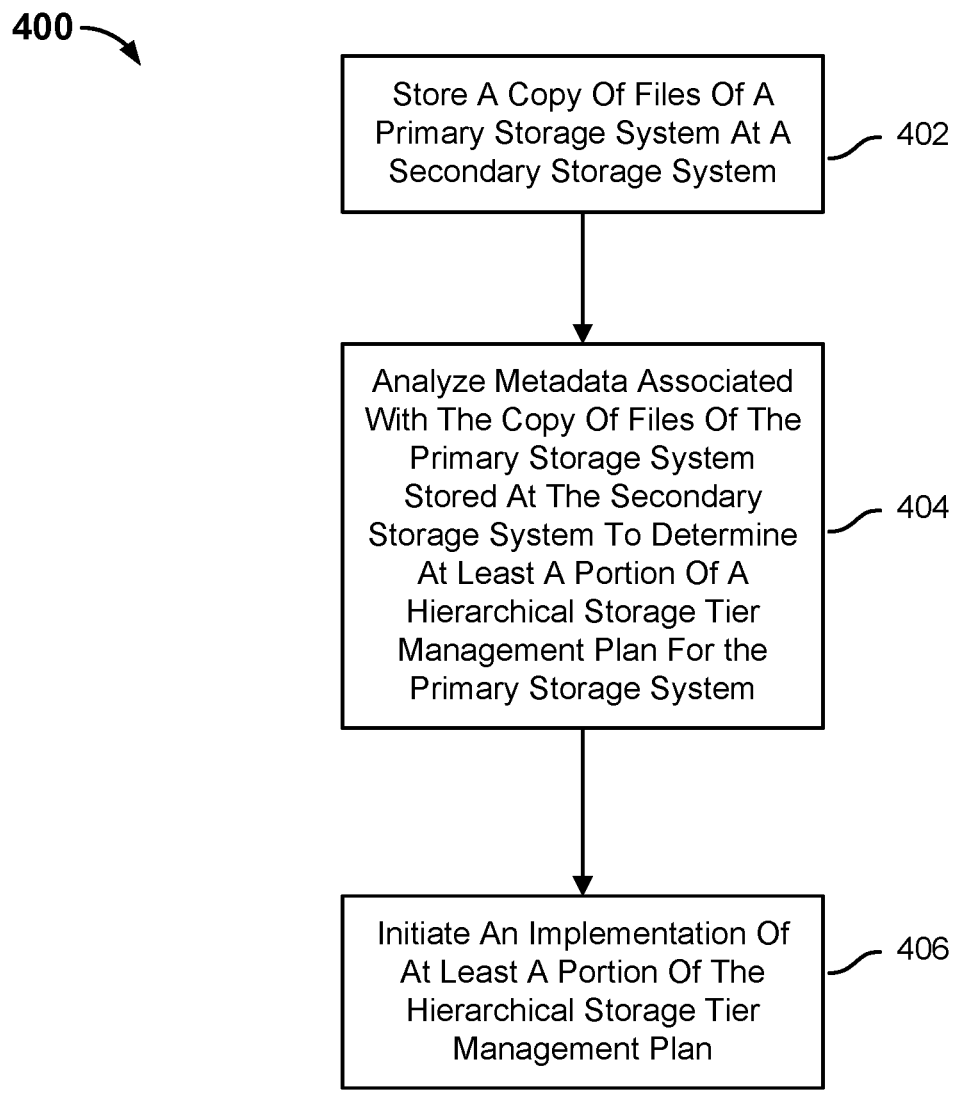
FIG. 4 is a flow chart illustrating a process for implementing a hierarchical storage tier management plan in accordance with some embodiments.

FIG. 4 is a flow chart illustrating a process for implementing a hierarchical storage tier management plan in accordance with some embodiments. In the example shown, process 400 may be implemented by a secondary storage system, such as secondary storage system 122.

At 402, a copy of files of a primary storage system is stored at a secondary storage system. A primary storage system may perform a backup snapshot and send a copy of the files stored on primary storage system. In some embodiments, the primary storage system performs a full backup snapshot and sends all the data associated with files stored on the primary storage system. In some embodiments, the primary storage system performs an incremental backup snapshot and sends the data associated with files stored on the primary storage system that was not included in a previous backup snapshot. In some embodiments, the copy of files includes data associated with the files and metadata associated with the files. In some embodiments, the copy of files includes data associated with the files, but excludes the metadata associated with the files.

In some embodiments, the copy of files of the primary storage system is replicated to the secondary storage system. For example, a backup system may perform a backup of the primary storage system. A backup of a backup system may be performed. The backup system may replicate the copy of files of the primary storage system to the secondary storage system.

At 404, the metadata associated with the copy of files of the primary storage system stored at the secondary storage system is analyzed to determine at least a portion of a hierarchical storage tier management plan for the primary storage system. The metadata associated with the copy of files of the primary storage system may include source metadata and/or inferred metadata.

Source metadata that was included in a backup snapshot may include access control information and historical information. Access control information may include the owner of the file, the creator of the file, the last modifier of the file, users or groups allowed read, write, or modify access to the file, and more. Historical information may include a creation time, a last edited time, a last read time, a last access time, etc. The source metadata that was included in a backup snapshot may be analyzed to determine at least the portion of the hierarchical storage tier management plan for the primary storage system.

After one or more backup snapshots are performed, the secondary storage system may be configured to infer metadata associated with a file. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The source metadata associated with the file provides the secondary storage system with point-in-time metadata information. The source metadata associated with the file may have changed a plurality of times in between backup snapshots, but the source metadata associated with the file included in a backup snapshot represents a state of the source metadata associated with the file at the time the backup snapshot is performed.

The inferred metadata associated with a file also provides the secondary storage system with point-in-time metadata information. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The secondary storage system may analyze the source metadata and/or the inferred metadata associated with all of the files backed up from the primary storage system within a particular time period to determine which files should remain on the primary storage system and which files should be migrated from the primary storage system to a different storage tier (e.g., the secondary storage system, cloud storage, etc.). The secondary storage system may tier files stored on the primary storage system using a hierarchical storage tier management plan that is based on one or more tiering policies.

A tiering policy may indicate that files that have not been created, accessed, or modified (e.g., data associated with a file or metadata associated with the file) within a particular time period are to be migrated from the primary storage system to a different storage tier. The tiering policy may be applied to the metadata associated with the file (source or inferred) to identify one or more files to migrate the file from the primary storage system to the different storage tier. For each copy of a file of a primary storage system that is stored at the secondary storage system, the secondary storage system may use the source or inferred metadata associated with a file to determine whether the file has been created, accessed, or modified within the particular time period.

A tiering policy may indicate that files that have not been accessed or modified (e.g., data associated with a file or metadata associated with the file) more than a threshold number of times within a particular time period are to be migrated from the primary storage system to a different storage tier. The secondary storage system may traverse the file system metadata snapshot trees associated with the particular time period to determine an estimated number of times a file has been accessed or modified within the particular time period. For each copy of a file of a primary storage system that is stored at the secondary storage system, the secondary storage system may compare the estimated number of times the file has been accessed or modified within the particular time period to the threshold number, to identify one of more files.

At 406, an implementation of at least a portion of the hierarchical storage tier management plan is initiated.

In some embodiments, the secondary storage system verifies that the data or metadata associated with one or more identified files has not been modified since a last backup snapshot by sending to the primary storage system a request to verify that an identified file has not changed since the last backup snapshot. In response to receiving the request, the primary storage system may use a change block tracker or equivalent to determine whether the data or metadata associated with an identified file has changed since the last backup snapshot. The primary storage system may send to the secondary storage system a result of the verification. In the event the file has changed since the last backup snapshot, the secondary storage system may re-evaluate its decision to tier the file to a different storage tier. In the event the data or metadata associated with the file has not changed since the last backup snapshot, the secondary storage system may maintain its decision to migrate the file to a different storage tier.

In some embodiments, the different storage tier already stores a latest version of the file. In the event the different storage tier already stores the latest version of the file, the secondary storage system may send file relocation metadata corresponding to the file to the primary storage system. The file relocation metadata corresponding to the file may include an absolute path name for the file and a location of the file on the different storage tier. In some embodiments, the different storage tier does not store a latest version of the file. In the event the different storage tier does not store the latest version of the file, the secondary storage system may send to the primary storage system instructions to copy the file (i.e., the latest version of the file) to the different storage tier. After the latest version of the file is copied to the different storage tier, the secondary storage system may send file relocation metadata corresponding to the file to the primary storage system.

In some embodiments, in response to receiving the file relocation metadata, the primary storage system may generate a file relocation object (e.g., symbolic link, stub file, etc.) corresponding to the file, store the file relocation object corresponding to the file, and delete the file.

In some embodiments, the primary storage system includes a filter driver and in response to receiving the file relocation metadata, the filter driver of the primary storage system maintains the file relocation metadata corresponding to the file and the primary storage system deletes the file.

Figure 5:
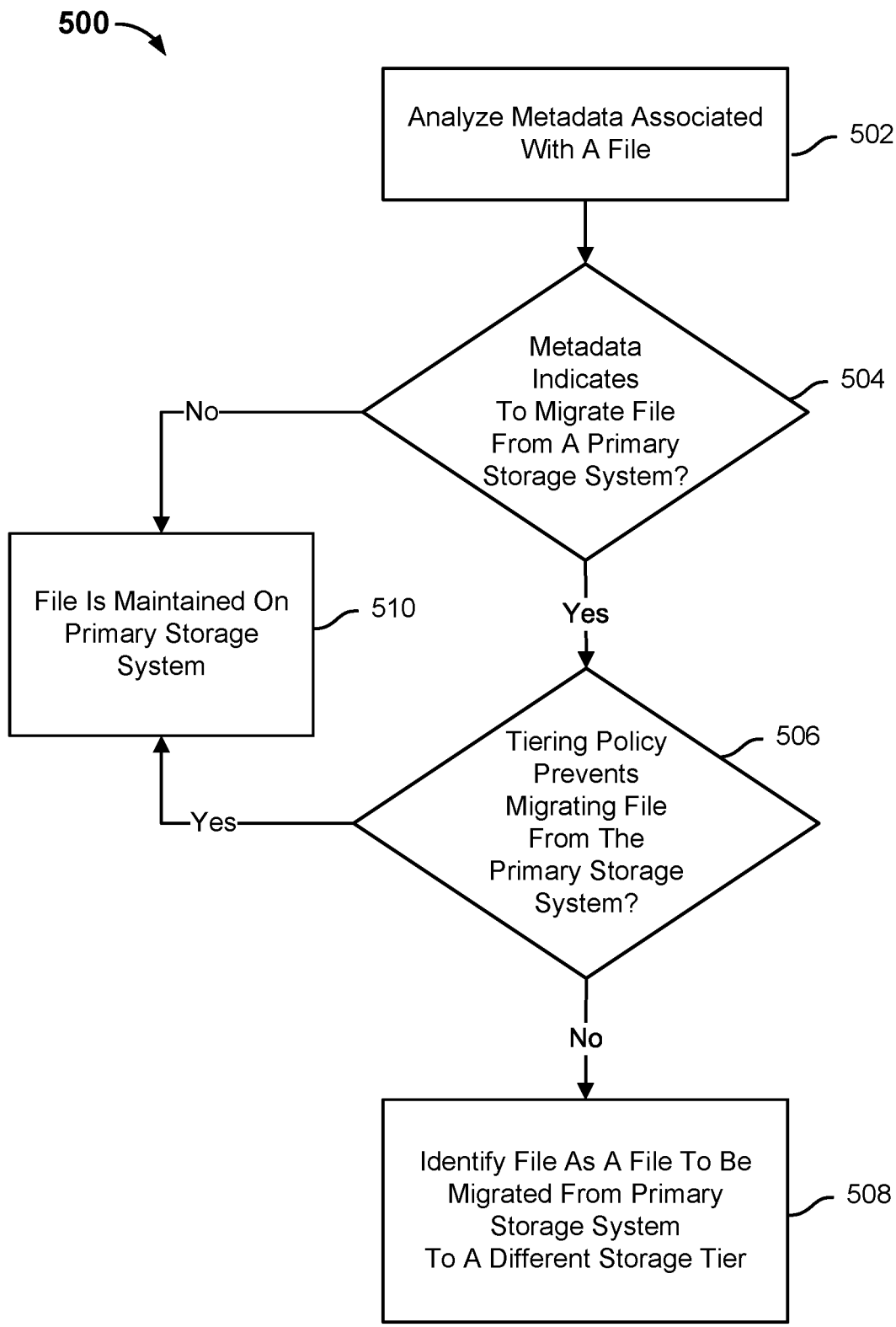
FIG. 5 is a flow chart illustrating a process for analyzing metadata associated with a copy of a file in accordance with some embodiments.

FIG. 5 is a flow chart illustrating a process for analyzing metadata associated with a copy of a file in accordance with some embodiments. In the example shown, process 500 may be implemented by a storage system, such as secondary storage system 122. In some embodiments, process 500 is implemented to perform some or all of step 404 of process 400.

At 502, metadata associated with a file is analyzed. A storage system may store metadata associated with a plurality of versions of the file. The metadata associated with a file may include source metadata and/or inferred metadata.

Source metadata associated with a file may include access control information and historical information. Access control information may include the owner of the file, the creator of the file, the last modifier of the file, users or groups allowed read, write, or modify access to the file, and more. Historical information may include a creation time, a last edited time, a last read time, a last access time, etc.

Inferred metadata associated with a file may be based on the source metadata associated with a file that is received in one or more backup snapshots, data associated with the file that is received in one or more backup snapshots, and/or metadata determined based on backup snapshot information. The inferred metadata associated with a file may be used to determine an estimated number of times a file was accessed or modified within a particular time period. The inferred metadata associated with a file may be used to determine whether any of the access control information associated with the file has changed within a particular time period.

The storage system may use the metadata associated with the file (source or inferred) to determine whether the file was created, accessed, or modified within a particular time period. The storage system may also use the metadata associated with the file (source or inferred) to determine whether the file was accessed or modified more than a threshold number of times within a particular time period.

At 504, it is determined whether the metadata associated with the file indicates to migrate the file from a primary storage system. In some embodiments, it is determined whether the file has not been created, accessed, or modified within a particular time period. In some embodiments, it is determined whether the file has not been accessed or modified more than a threshold number of times within a particular time period. In some embodiments, it is determined whether an owner of the file has left the company. In some embodiments, it is determined whether an entity (e.g., enterprise, company, person, etc.) associated with the primary storage system is under legal investigation.

In the event it is determined that the metadata associated with the file indicates to migrate the file from a primary storage system, process 500 proceeds to 506. For example, the file has not been created, accessed, or modified within a particular time period or the file has not been accessed or modified more than a threshold number of times within a particular time period.

In the event it is determined that the metadata associated with the file does not indicate to migrate the file from a primary storage system, process 500 proceeds to 510. For example, an entity associated with the primary storage system may be under legal investigation.

At 506, it is determined whether a tiering policy prevents migrating the file from the primary storage system. A tiering policy with the primary storage system may indicate that a file associated with a particular department or a particular type of file is to remain stored on the primary storage system, regardless of when the file was created, last accessed, last modified, or last edited.

In the event it is determined that a tiering policy does not prevent migrating the file from the primary storage system, process 500 proceeds to 508. In the event it is determined that a tiering policy prevents migrating the file from the primary storage system, process 500 proceeds to 510. At 508, the file is identified as a file to be migrated from the primary storage system to a different storage tier.

At 510, the file is maintained on the primary storage system.

Figure 6:
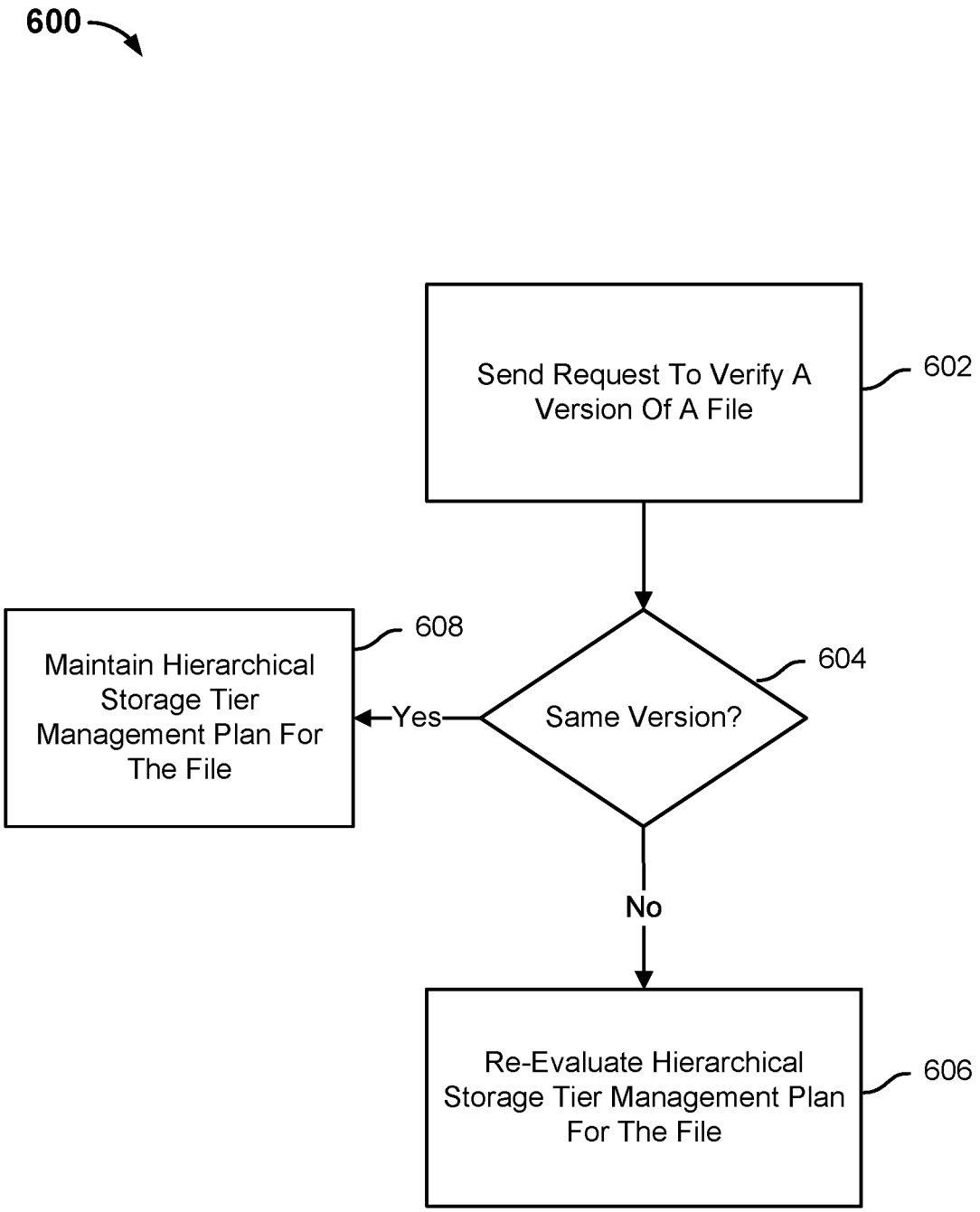
FIG. 6 is a flow chart illustrating a process for verifying a file in accordance with some embodiments.

FIG. 6 is a flow chart illustrating a process for verifying a file in accordance with some embodiments. In the example shown, process 600 may be implemented by a storage system, such as secondary storage system 122. In some embodiments, process 600 is implemented to perform some or all of step 406 of process 400.

At 602, a request to verify a version of a file is sent to a primary storage system. A secondary storage system may have determined that the file is to be migrated from the primary storage system to a different storage tier. The determination may have been based on metadata associated with a last backup snapshot. However, the file may have been modified since the last backup snapshot.

At 604, it is determined whether a version of the file stored on the primary storage system matches a version of the file stored on the secondary storage system. The primary storage system may send an indication of whether the file has changed since the last backup snapshot. The primary storage system may have a change block tracker that monitors changes to files in between backup snapshots. In the event the change block tracker stores a record of the one or more data blocks associated with the file having changed since the last backup snapshot, the primary storage system may provide to the secondary storage system an indication that the file has changed since the last backup snapshot. In the event the change block tracker does not store a record of the one or more data blocks associated with the file having changed since the last backup snapshot, the primary storage system may provide to the secondary storage system, an indication that the file has not changed since the last backup snapshot. In response to receiving the indication, the secondary storage system may determine whether the version of the file stored on the primary storage system matches the version of the file stored on the secondary storage system.

In the event the change block tracker stores a record of the one or more data blocks associated with the file having changed since the last backup snapshot, the primary storage system may provide to the secondary storage system, an indication that the file has changed since the last backup snapshot. In response to receiving the indication, the secondary storage system may determine that the version of the file stored on the primary storage system does not match the version of the file stored on the secondary storage system. In the event it is determined that the version of the file stored on the primary storage system does not match a version of the file stored on the secondary storage system, process 600 proceeds to 606.

In the event the change block tracker does not store a record of the one or more data blocks associated with the file having not changed since the last backup snapshot, the primary storage system may provide to the secondary storage system, an indication that the file has not changed since the last backup snapshot. In response to receiving the indication, the secondary storage system may determine that the version of the file stored on the primary storage system matches the version of the file stored on the secondary storage system. In the event it is determined that the version of the file stored on the primary storage system matches a version of the file stored on the secondary storage system, process 600 proceeds to 608.

At 606, a hierarchical storage tier management plan for the file is re-evaluated. In some embodiments, the file was identified as a candidate to be migrated from a primary storage system to a different storage tier. The latest version of the file may include metadata associated with the file, such as access control information and historical information. Additional metadata associated with the file may be inferred based on the latest version of the file. The metadata included with the latest version of the file and/or the inferred metadata may be used to determine whether the file is still a candidate file to be migrated from the primary storage system to the different storage tier.

In some embodiments, the file is determined to still be a candidate file to be migrated from the primary storage system to the different storage tier. For example, the estimated number of times that a file was accessed or modified is still less than a threshold number of times within a particular time period.

In some embodiments, the file is not determined to still be a candidate file to be migrated from the primary storage system to the different storage tier. For example, the file may have been accessed or modified within a particular time period.

At 608, the hierarchical storage tier management plan for the file is maintained.

Figure 7:
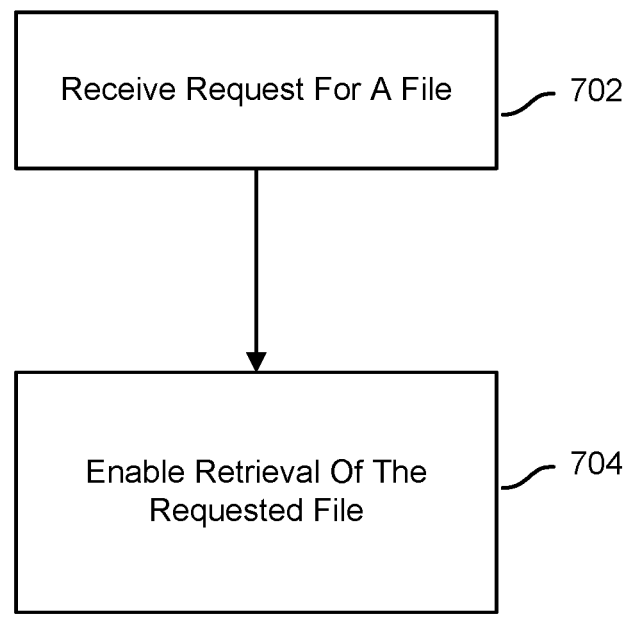
FIG. 7 is a flow chart illustrating an embodiment of providing a file.

FIG. 7 is a flow chart illustrating an embodiment of providing a file. In the example shown, process 700 may be performed by a primary storage system, such as primary storage system 112.

At 702, a request for a file is received. A file may be stored on a primary storage system, a secondary storage system, or a cloud storage system. The request may be received from a client device or an application/process/service running on the primary storage system.

At 704, retrieval of the requested file is enabled. In some embodiments, the primary storage system stores a file relocation object associated with the requested file. The file relocation object may store file relocation metadata associated with the object. In some embodiments, in response to a request for the file from a requesting entity, the primary storage system reads the file relocation object for the file to identify a storage system storing the data associated with the requested file and provides to the requesting entity a link to the storage system storing the data associated with the requested file. In some embodiments, in response to a request for the file from a requesting entity, the primary storage system reads the file relocation object associated with the requested file and redirects the request to a storage system storing the data associated with the requested file.

In some embodiments, primary storage system uses a filter driver to enable retrieval of the requested file. The filter driver may maintain file relocation metadata for a file and in response to a request for the file from a requesting entity, the filter driver intercepts the request, reads the file relocation metadata, retrieves the data associated with the file from a location included in the file relocation metadata, and provides the data associated with the requested file to the requesting entity.

Figure 8:
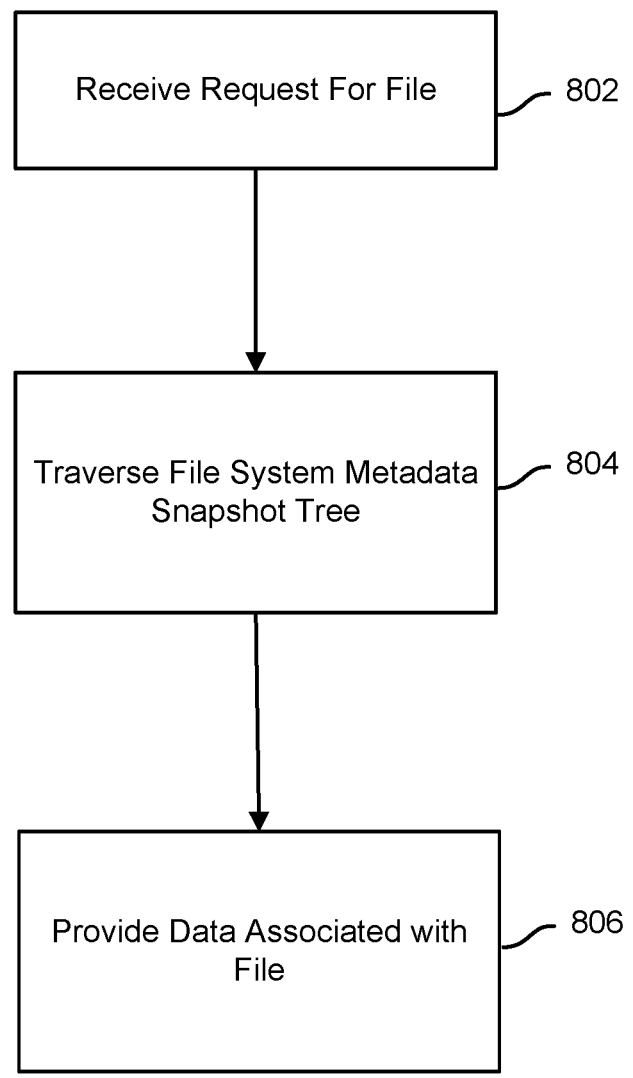
FIG. 8 is a flow chart illustrating an embodiment of providing a file.

FIG. 8 is a flow chart illustrating an embodiment of providing a file. In the example shown, process 800 may be performed by a secondary storage system, such as secondary storage system 122.

At 802, a request for a file is received at a secondary storage system. The request may include a location associated with the requested file. In some embodiments, the request is received from a primary storage system. In some embodiments, the request is received from a client device that requested the file at the primary storage system.

At 804, a file system metadata snapshot tree is traversed. The file system metadata snapshot tree may be traversed to a location that is identified in the request.

A file system manager of a secondary storage system may organize the data associated with the file using a tree data structure. The view of the file data corresponding to the backup is comprised of a file system metadata snapshot tree and a plurality of file metadata structures. A file metadata structure is configured to store the file metadata associated with a file. A file system metadata snapshot tree includes a root node, one or more levels of one or more intermediate nodes associated with the root node, and one or more leaf nodes associated with an intermediate node of the lowest intermediate level. A root node of a file system metadata snapshot tree corresponds to a particular moment in time when a backup was performed. A file system metadata snapshot tree that corresponds to the requested file is identified (e.g., from the redirected request). The identified file system metadata snapshot tree may correspond to a last time the requested file was backed up to the secondary storage system.

A file system metadata snapshot tree associated with the requested file may be traversed from the root node of the snapshot tree to one of the leaf nodes of the snapshot tree corresponding to the requested file.

In the event the size of the data associated with the file is less than a limit size, a leaf node of the file system metadata snapshot tree may store the data associated with the file. In the event the size of the file is greater than or equal to the limit size, the file metadata associated with the file is stored in a metadata structure. A leaf node of the snapshot tree may include an identifier or a pointer to the file metadata structure corresponding to the file. The file metadata structure corresponding to the file may be traversed to determine the location of the data associated with the file.

At 806, data associated with the file is provided. In some embodiments, the data associated with a file is stored in a leaf node of a file system metadata snapshot tree. The data associated with the file may be read from the leaf node of the file system metadata snapshot tree and provided to a requesting system.

In some embodiments, the data associated with a file is stored on a storage system and a file metadata structure corresponding to the file is traversed to provide the data associated with the file.

Figure 9:
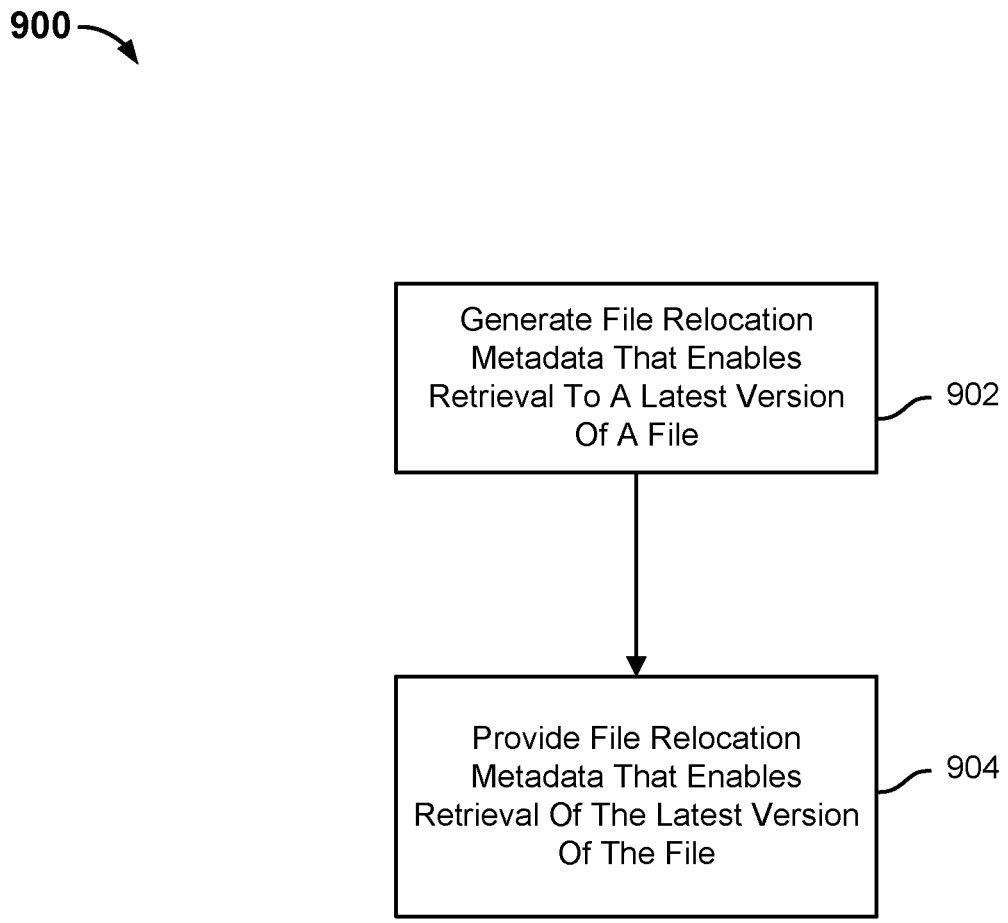
FIG. 9 is a flow chart illustrating an embodiment of providing a file relocation metadata.

FIG. 9 is a flow chart illustrating an embodiment of providing a file relocation metadata. In the example shown, process 900 may be performed by a secondary storage system, such as secondary storage system 122.

At 902, file relocation metadata that enables retrieval of a latest version of a file is generated. The file relocation metadata corresponding to the file may include an absolute path name for the file and a location of the file on the different storage tier. In some embodiments, the different storage tier is a secondary storage system. In some embodiments, the different storage tier is a cloud storage system.

At 904, the file relocation metadata that enables retrieval of the latest version of the file is provided. In some embodiments, in response to receiving the file relocation metadata, the primary storage system may generate a file relocation object (e.g., symbolic link, stub file, etc.) corresponding to the file, store the file relocation object corresponding to the file, and delete the file. In some embodiments, the primary storage system includes a filter driver and in response to receiving the file relocation metadata, the filter driver of the primary storage system maintains the file relocation metadata corresponding to the file.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
storing a copy of files of a primary storage system at a secondary storage system;
generating, by the secondary storage system, metadata associated with the copy of files of the primary storage system stored at the secondary storage system that enables data associated with the copy of files to be located at the secondary storage system, wherein the generated metadata associated with the copy of files of the primary storage system stored at the secondary storage system that enables the data associated with the copy of files to be located at the secondary storage system includes a corresponding tree data structure associated with each version of a corresponding file, wherein at least one corresponding tree data structure associated with at least one version of the corresponding file has a corresponding timestamp;
analyzing, by the secondary storage system, the generated metadata associated with the copy of the files of the primary storage system stored at the secondary storage system that enables the data associated with the copy of files to be located at the secondary storage system to determine at least a portion of a hierarchical storage tier management plan for the primary storage system including by:
inferring one or more statistics associated with the copy of files stored at the secondary storage system from the corresponding tree data structure associated with each version of the corresponding file, wherein the one or more inferred statistics include an estimated number of times the file has been modified within a particular time period, wherein the estimated number of times the file has been accessed or modified within the particular time period is determined using timestamps of the tree data structures associated with different versions of the file; and
based on the one or more inferred statistics, identifying one or more files to be migrated from a first tier of storage of the primary storage system to a different storage tier, wherein the file is identified as one of the one or more files to be migrated from the first tier of storage of the primary storage system to the different storage tier in response to a determination that the estimated number of times the file has been access or modified within the particular time period is less than a threshold number of times within the particular time period; and
initiating, by the secondary storage system, an implementation of the at least the portion of the hierarchical storage tier management plan including by migrating the one or more identified files from the first tier of storage of the primary storage system to the different storage tier.

2. The method of claim 1, wherein the metadata associated with the copy of the files includes at least one of source metadata and inferred metadata.

3. The method of claim 2, wherein at least one of the source metadata and the inferred metadata provides point-in-time metadata information.

4. The method of claim 1, wherein identifying the one or more files to be migrated from the first tier of storage of the primary storage system to the different storage tier includes determining whether metadata associated with a file indicates to migrate the file from the first tier of storage of the primary storage system.

5. The method of claim 4, wherein the metadata associated with the file indicates to migrate the file from the first tier of storage of the primary storage system in the event the file has not been created, accessed, or modified within the particular time period.

6. The method of claim 4, wherein the metadata associated with the file indicates to migrate the file from the first tier of storage of the primary storage system in the event the file has not been accessed or modified more than the threshold number of times within the particular time period.

7. The method of claim 4, in response to determining that the metadata associated with the file indicates to migrate the file from the first tier of storage of the primary storage system, determining whether a policy associated with the primary storage system prevents the file from being migrated from the primary storage system.

8. The method of claim 7, in response to determining that the policy associated with the primary storage system does not prevent the file from being migrated from the primary storage system, identifying the file as a file to be migrated from the first tier of storage of the primary storage system to the different storage tier.

9. The method of claim 4, in response to determining that that the metadata associated with the file does not indicate to migrate the file from the first tier of storage of the primary storage system, the file is maintained on the primary storage system.

10. The method of claim 1, wherein initiating the implementation of the at least the portion of the hierarchical storage tier management plan comprises sending a request for a latest version of a file to the primary storage system.

11. The method of claim 10, wherein initiating the implementation of the at least the portion of the hierarchical storage tier management plan further comprises receiving the latest version of the file.

12. The method of claim 1, wherein initiating the implementation of the at least the portion of the hierarchical storage tier management plan further comprises providing to the primary storage system file relocation metadata that enables retrieval of a latest version of a file stored on the different storage tier.

13. The method of claim 1, wherein the different storage tier is the secondary storage system.

14. The method of claim 1, wherein the different storage tier is a cloud storage system.

15. The method of claim 1, wherein initiating the implementation of the at least the portion of the hierarchical storage tier management plan further comprises verifying whether data associated with the one or more files or metadata associated with the one or more identified files has not been modified since a last backup snapshot.

16. A computer program product, the computer program product being embodied in a non-transitory computer readable storage medium and comprising computer instructions for:

storing a copy of files of a primary storage system at a secondary storage system;

generating, by the secondary storage system, metadata associated with the copy of files of the primary storage system stored at the secondary storage system that enables data associated with the copy of files to be located at the secondary storage system, wherein the generated metadata associated with the copy of files of the primary storage system stored at the secondary storage system that enables the data associated with the copy of files to be located at the secondary storage system includes a corresponding tree data structure associated with each version of a corresponding file, wherein at least one corresponding tree data structure associated with at least one version of the corresponding file has a corresponding timestamp;

analyzing, by the secondary storage system the generated metadata associated with the copy of the files of the primary storage system stored at the secondary storage system that enables the data associated with the copy of files to be located at the secondary storage system to determine at least a portion of a hierarchical storage tier management plan for the primary storage system including by:

inferring one or more statistics associated with the copy of files stored at the secondary storage system from the corresponding tree data structure associated with each version of the corresponding file, wherein the one or more inferred statistics include an estimated number of times the file has been modified within a particular time period, wherein the estimated number of times the file has been accessed or modified within the particular time period is determined using timestamps of the tree data structures associated with different versions of the file; and based on the one or more inferred statistics, identifying one or more files to be migrated from a first tier of storage of the primary storage system to a different storage tier, wherein the file is identified as one of the one or more files to be migrated from the first tier of storage of the primary storage system to the different storage tier in response to a determination that the estimated number of times the file has been access or modified within the particular time period is less than a threshold number of times within the particular time period; and initiating an implementation of the at least the portion of the hierarchical storage tier management plan including by migrating the one or more identified files from the first tier of storage of the primary storage system to the different storage tier.

17. The computer program product of claim 16, wherein identifying the one or more files to be migrated from the first tier of storage of the primary storage system to the different storage tier includes determining whether metadata associated with a file indicates to migrate the file from the first tier of storage of the primary storage system.

18. The computer program product of claim 17, wherein the metadata associated with the file indicates to migrate the file from the first tier of storage of the primary storage system in the event the file has not been created, accessed, or modified within the particular time period.

19. The computer program product of claim 17, wherein the metadata associated with the file indicates to migrate the file from the first tier of storage of the primary storage system in the event the file has not been accessed or modified more than the threshold number of times within the particular time period.

20. A system, comprising:

a processor; and a memory coupled with the processor, wherein the memory is configured to provide the processor with instructions which when executed cause the processor to:

store a copy of files of a primary storage system at a secondary storage system;

generate, by the secondary storage system, metadata associated with the copy of files of the primary storage system stored at the secondary storage system that enables data associated with the copy of files to be located at the secondary storage system, wherein the generated metadata associated with the copy of files of the primary storage system stored at the secondary storage system that enables the data associated with the copy of files to be located at the secondary storage system includes a corresponding tree data structure associated with each version of a corresponding file, wherein at least one corresponding tree data structure associated with at least one version of the corresponding file has a corresponding timestamp;

analyze, by the secondary storage system, the generated metadata associated with the copy of the files of the primary storage system stored at the secondary storage system that enables the data associated with the copy of files to be located at the secondary storage system to determine at least a portion of a hierarchical storage tier management plan for the primary storage system including by:

inferring one or more statistics associated with the copy of files stored at the secondary storage system from the corresponding tree data structure associated with each version of the corresponding file, wherein the one or more inferred statistics include an estimated number of times the file has been modified within a particular time period, wherein the estimated number of times the file has been accessed or modified within the particular time period is determined using timestamps of the tree data structures associated with different versions of the file; and based on the one or more inferred statistics, identifying one or more files to be migrated from a first tier of storage of the primary storage system to a different storage tier, wherein the file is identified as one of the one or more files to be migrated from the first tier of storage of the primary storage system to the different storage tier in response to a determination that the estimated number of times the file has been access or modified within the particular time period is less than a threshold number of times within the particular time period; and initiate an implementation of the at least the portion of the hierarchical storage tier management plan including by migrating the one or more identified files from the first tier of storage of the primary storage system to the different storage tier.

* * * * *